(12) United States Patent
Xu et al.

(10) Patent No.: US 10,907,110 B2
(45) Date of Patent: Feb. 2, 2021

(54) PROCESS FOR TREATING GASOLINE

(71) Applicants: CHINA PETROLEUM & CHEMICAL CORPORATION, Beijing (CN); RESEARCH INSTITUTE OF PETROLEUM PROCESSING, SINOPEC, Beijing (CN)

(72) Inventors: Youhao Xu, Beijing (CN); Yibin Luo, Beijing (CN); Xin Wang, Beijing (CN); Ying Ouyang, Beijing (CN); Zhijian Da, Beijing (CN); Xingtian Shu, Beijing (CN); Xieqing Wang, Beijing (CN)

(73) Assignees: CHINA PETROLEUM & CHEMICAL CORPORATION, Beijing (CN); RESEARCH INSTITUTE OF PETROLEUM PROCESSING, SINOPEC, Beijing (CN)

( * ) Notice: Subject to any disclaimer, the term of this patent is extended or adjusted under 35 U.S.C. 154(b) by 0 days.

(21) Appl. No.: 16/339,670

(22) PCT Filed: Oct. 20, 2017

(86) PCT No.: PCT/CN2017/000634
§ 371 (c)(1),
(2) Date: Apr. 4, 2019

(87) PCT Pub. No.: WO2018/072343
PCT Pub. Date: Apr. 26, 2018

(65) Prior Publication Data
US 2019/0233749 A1 Aug. 1, 2019

(30) Foreign Application Priority Data

Oct. 21, 2016 (CN) .......................... 2016 1 0921175
Oct. 21, 2016 (CN) .......................... 2016 1 0921806
(Continued)

(51) Int. Cl.
C10G 69/14 (2006.01)
B01J 20/08 (2006.01)
(Continued)

(52) U.S. Cl.
CPC ............ *C10G 69/14* (2013.01); *B01J 20/024* (2013.01); *B01J 20/08* (2013.01); *B01J 20/103* (2013.01);
(Continued)

(58) Field of Classification Search
None
See application file for complete search history.

(56) References Cited

U.S. PATENT DOCUMENTS 3,758,403 A 9/1973 Rosinski et al.

FOREIGN PATENT DOCUMENTS

CN 1488723 A 4/2004
CN 100366708 C 2/2008
(Continued)

OTHER PUBLICATIONS

Yongfang Xue, "Research Technique for Solid Catalysts", Petrochemical Technology, No. 29, vol. 3, 2000, pp. 227-235.
(Continued)

*Primary Examiner* — Tam M Nguyen
(74) *Attorney, Agent, or Firm* — Novick, Kim & Lee, PLLC; Allen Xue

(57) ABSTRACT

The present application relates to a process for treating gasoline, comprising the steps of: contacting a gasoline
(Continued)

feedstock with a mixed catalyst and subjecting it to desulfurization and aromatization in the presence of hydrogen to obtain a desulfurization-aromatization product; optionally, splitting the resulting desulfurization-aromatization product into a light gasoline fraction and a heavy gasoline fraction; and, optionally, subjecting the resulting light gasoline fraction to etherification to obtain an etherified oil; wherein the mixed catalyst comprises an adsorption desulfurization catalyst and an aromatization catalyst. The process of the present application is capable of reducing the sulfur and olefin content of gasoline and at the same time increasing the octane number of the gasoline while maintaining a high yield of gasoline.

18 Claims, 1 Drawing Sheet

(30) Foreign Application Priority Data

| | | |
|---|---|---|
| Oct. 21, 2016 | (CN) | 2016 1 0921955 |
| Oct. 21, 2016 | (CN) | 2016 1 0921999 |
| Oct. 21, 2016 | (CN) | 2016 1 0922006 |

(51) Int. Cl.

| | |
|---|---|
| C10G 45/20 | (2006.01) |
| C10G 45/06 | (2006.01) |
| C10G 45/68 | (2006.01) |
| B01J 29/85 | (2006.01) |
| B01J 20/10 | (2006.01) |
| B01J 20/02 | (2006.01) |
| C10G 29/22 | (2006.01) |
| B01J 37/28 | (2006.01) |
| C10G 69/00 | (2006.01) |
| B01J 35/10 | (2006.01) |
| B01J 37/00 | (2006.01) |
| C10G 45/04 | (2006.01) |
| B01J 35/00 | (2006.01) |
| B01J 29/46 | (2006.01) |
| B01J 29/14 | (2006.01) |

(52) U.S. Cl.
CPC ............ *B01J 29/146* (2013.01); *B01J 29/46* (2013.01); *B01J 29/85* (2013.01); *B01J 35/002* (2013.01); *B01J 35/1019* (2013.01); *B01J 37/0045* (2013.01); *B01J 37/28* (2013.01); *C10G 29/22* (2013.01); *C10G 45/04* (2013.01); *C10G 45/06* (2013.01); *C10G 45/20* (2013.01); *C10G 45/68* (2013.01); *C10G 69/00* (2013.01); *B01J 2229/66* (2013.01); *C10G 2300/1037* (2013.01); *C10G 2300/202* (2013.01); *C10G 2400/02* (2013.01); *C10G 2400/30* (2013.01)

(56) References Cited

FOREIGN PATENT DOCUMENTS

| | | |
|---|---|---|
| CN | 101270301 A | 9/2008 |
| CN | 101492608 A | 7/2009 |
| CN | 101492609 A | 7/2009 |
| CN | 101845322 A | 9/2010 |
| CN | 103525460 A | 1/2014 |
| CN | 104479738 A | 4/2015 |
| CN | 105647581 A | 6/2016 |
| RU | 2276182 C2 | 5/2006 |
| RU | 2372988 C1 | 11/2009 |
| RU | 2482162 C1 | 5/2013 |
| WO | 2014068209 A1 | 5/2014 |

OTHER PUBLICATIONS

Cuiding Yang et al., "Petrochemical analysis methods," Science Press, Sep. 1990, pp. 263-268 and 303-304, ISBN: 7-03-001894-X.
Intellectual Property Office of Singapore, "Search Report and Written Option", dated May 29, 2020.

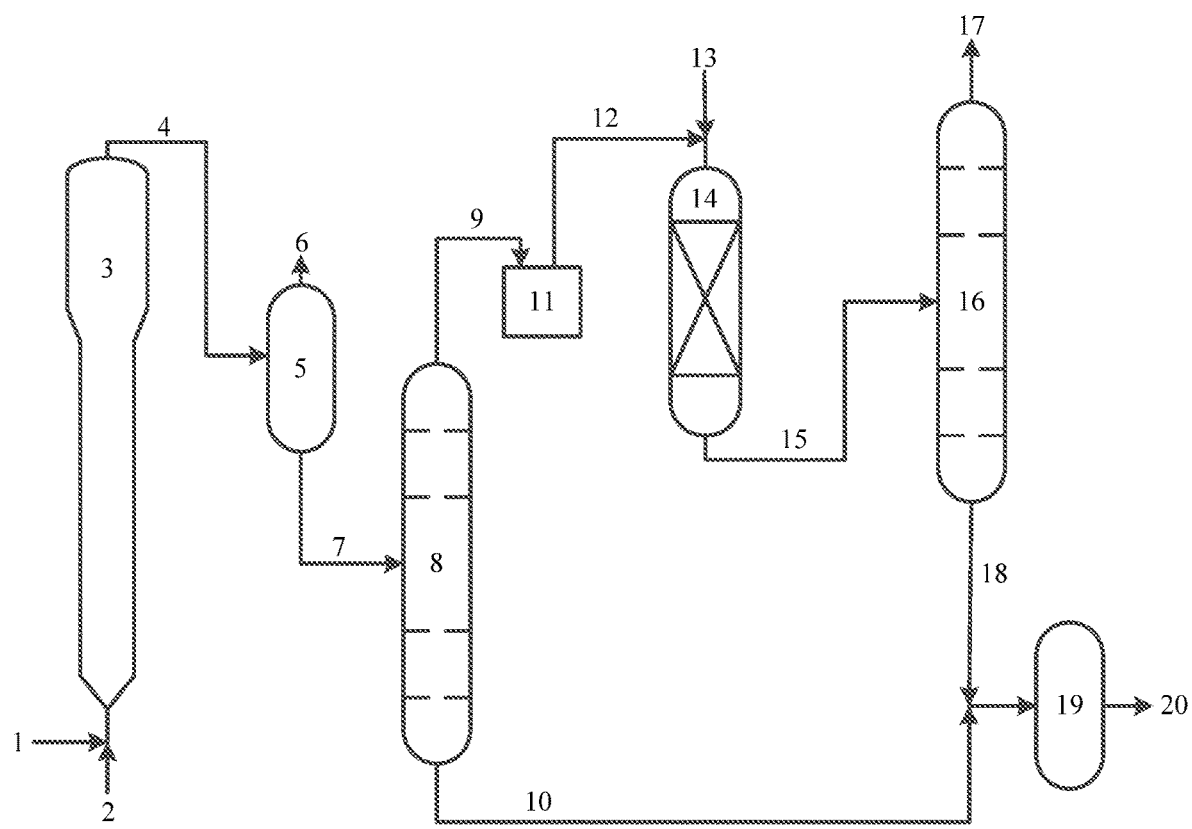

PROCESS FOR TREATING GASOLINE

TECHNICAL FIELD

The present application relates to a process for treating gasoline, and particularly to a process for the desulfurization of gasoline.

BACKGROUND ART

Air pollution caused by vehicle exhaust emissions is getting worse. With the increasing emphasis on environmental protection, countries around the world have accelerated the pace of upgrading the quality of fuel for vehicles. For example, the Chinese national standard GB17930-2016 requires the sulfur content of gasoline to be not more than 10 µg/g, and the volume fraction of olefin in gasoline to be not more than 24%.

Catalytic cracking gasoline is a major component of motor gasoline, accounting for about 75% in gasoline pools, and is characterized by high olefin and sulfur content. It is not difficult to achieve deep desulfurization of gasoline and reduce the olefin contents in catalytic cracking gasoline by hydrogenation technology. However, since olefin is a high-octane component, a great reduce of its content will lead to a great loss of the octane number of gasoline, thereby affecting the performance of gasoline in automobiles and the economic benefits of refineries. Thus, techniques for deep desulfurization of gasoline while maintaining the octane number of gasoline has become a hot spot in clean gasoline production.

At present, the deep desulfurization of gasoline is mainly performed by hydrodesulfurization or adsorption desulfurization.

Selective hydrodesulfurization is one of the main ways to remove thiophene-based sulfides, but the saturation reaction of olefins and other reactions may also occur in large quantities, resulting in a great loss of the octane number. In addition, the deep hydrogenation process for restoring octane number is also approved by practitioners, which comprises providing a second reactor to promote the cracking, isomerization and alkylation reactions of low-octane hydrocarbons while performing deep desulfurization and olefin saturation, so as to achieve the goal of restoring the octane number.

Chinese patent application No. CN101845322A discloses a process for reducing the content of sulfur and olefin in gasoline, in which the catalytic cracking gasoline feedstock is firstly treated in a prehydrogenation reactor to remove dienes, and then split by fractionation in a fractionation column into light and heavy gasolines; the light gasoline is subjected to adsorption desulfurization in the presence of hydrogen; the heavy gasoline is subjected to hydrodesulfurization in a selective hydrogenation reactor, the resulting reaction effluent is subjected to hydro-upgrading in a hydro-upgrading reactor to reduce the olefin content, and the upgraded heavy gasoline is blended with the product resulted from the adsorption desulfurization of the light gasoline to obtain clean gasoline that meets the standard requirements. The adsorption desulfurization catalyst may show a good effect in the removal of sulfides in gasoline, but the adsorption desulfurization is carried out in the presence of hydrogen, which would result in the saturation of olefins in the catalytic cracking gasoline. Especially when the light gasoline is subjected to adsorption desulfurization, there would be a great loss of the octane number, as the olefin component of the light gasoline has a higher octane number.

In adsorption processes for the removal of sulfur-containing compounds in fuel oil, light oils are subjected to reaction and adsorption in the presence of hydrogen using adsorbents, producing metal sulfides or removing sulfur by means of the polarity of sulfides, with a low hydrogen consumption and a high desulfurization efficiency. Gasoline with a sulfur content below 10 µg/g can be produced. Although deep desulfurization of gasoline can be achieved using adsorption processes with a low hydrogen consumption, there is still a slight loss of the octane number of the gasoline product. Especially when dealing with a gasoline feedstock with high olefin content and high sulfur content, a large loss of the octane number of gasoline would still be encountered.

For most catalytic cracking units, in order to increase the production of propylene and butene and increase the octane number of the gasoline, an effective way is to use a catalyst or adjuvant containing a molecular sieve having an MFI structure. U.S. Pat. No. 3,758,403 discloses the addition of ZSM-5 molecular sieves to a catalytic cracking catalyst to increase the octane number of gasoline and increase the yield of C3 to C4 olefins. However, as is known to those skilled in the art, the increase of the production of propylene and butene is at the expense of gasoline production.

Accordingly, there remains a need in the art for a process for treating gasoline that is capable of effectively reducing the sulfur and olefin content of gasoline while maintaining or even increasing the yield and the octane number of gasoline.

SUMMARY OF THE INVENTION

It is an object of the present application to provide a process and a system for treating gasoline that are capable of reducing sulfur and olefin content of gasoline, and at the same time increasing the octane number of gasoline while maintaining a high gasoline yield.

In order to achieve the above object, in one aspect, the present application provides a process for treating gasoline, comprising:

contacting a gasoline feedstock with a mixed catalyst and subjecting it to desulfurization and aromatization in the presence of hydrogen to obtain a desulfurization-aromatization product, wherein the mixed catalyst comprises an adsorption desulfurization catalyst and an aromatization catalyst, and at least about 50 wt %, preferably at least about 80 wt %, more preferably at least about 90 wt %, particularly preferably at least about 95 wt %, and most preferably about 100 wt % of the aromatization catalyst has undergone a passivation and/or aging treatment.

In another aspect, the present application provides a process for treating gasoline, comprising:

1) contacting a gasoline feedstock with a mixed catalyst and subjecting it to desulfurization and aromatization in the presence of hydrogen to obtain a desulfurization-aromatization product;

2) splitting at least a portion of the resulting desulfurization-aromatization product into a light gasoline fraction and a heavy gasoline fraction;

3) subjecting at least a portion of the resulting light gasoline fraction to etherification to obtain an etherified oil; and 4) optionally, mixing at least a portion of the etherified oil with at least a portion of the heavy gasoline fraction to provide a gasoline product, wherein the mixed catalyst comprises an adsorption desulfurization catalyst and an aromatization catalyst, and the aromatization catalyst is selected from the group consisting of a fresh aromatization catalyst, a passivated aromatization catalyst, an aged aromatization catalyst, or any combination thereof.

In still another aspect, the present application provides a system for treating gasoline, comprising a desulfurization-aromatization reactor, a high pressure separator, a full-range gasoline fractionation column, and an etherification unit, wherein the desulfurization-aromatization reactor is provided with a gasoline feedstock inlet, a hydrogen inlet, and a desulfurization-aromatization product outlet, the full-range gasoline fractionation column is provided with a full-range gasoline inlet, a light gasoline fraction outlet, and a heavy gasoline fraction outlet; the desulfurization-aromatization product outlet of the desulfurization-aromatization reactor is in fluid communication with the full-range gasoline inlet of the full-range gasoline fractionation column via the high pressure separator; and the light gasoline fraction outlet of the full-range gasoline fractionation column is in fluid communication with an inlet of the etherification unit, wherein a gasoline feedstock is introduced into the desulfurization-aromatization reactor through the gasoline feedstock inlet, and subjected to desulfurization and aromatization therein in the presence of hydrogen to obtain a desulfurization-aromatization product; the desulfurization-aromatization product is separated in the high-pressure separator into a hydrogen-containing tail gas and a full-range gasoline, the full-range gasoline is introduced into the full-range gasoline fractionation column through the full-range gasoline inlet, and subjected to fractionation therein into a light gasoline fraction and a heavy gasoline fraction; the light gasoline fraction is introduced into the etherification unit and subjected to etherification therein to obtain an etherified product.

The present application has at least one of the following advantageous effects as compared with the prior arts:

1. In the process of the present application, a gasoline feedstock with high sulfur and olefin contents is subjected to desulfurization and aromatization using an adsorption desulfurization catalyst and an aromatization catalyst, so that the sulfur in the gasoline can be reduced and the olefins in the gasoline can be cracked and aromatized at the same time producing hydrocarbons below $C_5$, which are preferably split into the light gasoline fraction for etherification, thereby reducing the olefin content of the gasoline, and increasing the octane number of the gasoline while maintaining a high yield of gasoline.

2. The desulfurization and aromatization of the present application can be carried out using existing adsorption desulfurization reactors with no need to modify them.

3. The desulfurization and aromatization of the present application are carried out in one reactor by using two kinds of catalysts, and thus the need for a separate aromatization reactor and its ancillary system in stepwise treatment processes (i.e. desulfurization and then aromatization or aromatization and then desulfurization) for gasoline can be avoided. Meanwhile, the problem associated with the modification of existing processes for producing difunctional catalysts for gasoline desulfurization and aromatization and the low abrasion strength of the catalyst can also be avoided. This provides not only an improvement in the reaction efficiency, but also a reduction in the investment cost.

4. Preferably, the aromatization catalyst of the present application has undergone a passivation and/or aging treatment to impart a moderate activity to the aromatization catalyst, thereby facilitating the aromatization process.

5. In the present application, the light gasoline fraction is preferably subjected to etherification, which can not only reduce the olefin content thereof, but also produce a high-octane etherified oil, and increase the octane number of the gasoline product.

6. The etherification preferably employed in the present application can further reduce light components in the gasoline product and thus reduce the vapor pressure of gasoline.

Other features and advantages of the present application will be described in detail in the Detailed Description section below.

BRIEF DESCRIPTION OF THE DRAWINGS

The drawings are provided to help the understanding of the present application, and should be considered as a part of the present description. The present application will be illustrated with reference to the drawings and the embodiments described herein below, which should not be considered to be limiting. In the drawings:

FIG. 1 is a schematic illustration of a preferred embodiment of the process and system of the present application.

DESCRIPTION OF THE REFERENCE NUMERALS

| | |
|---|---|
| 1 Gasoline feedstock | 2 Hydrogen |
| 3 Desulfurization-aromatization reactor | |
| 4 Desulfurization-aromatization product | |
| 5 High pressure separator | 6 Hydrogen-containing tail gas |
| 7 Full-range gasoline | 8 Full-range gasoline fractionation column |
| 9 Light gasoline fraction | 10 Heavy gasoline fraction |
| 11 Pretreatment unit | 12 Pre-etherification light gasoline |
| 13 Alcohol-containing stream | 14 Etherification unit |
| 15 Etherification product | 16 Etherification product fractionation column |
| 17 Alcohol-containing tail gas | 18 Etherified oil |
| 19 Mixer | 20 Gasoline product |

DETAILED DESCRIPTION OF THE INVENTION

Embodiments of the present application will be described in detail below with reference to the drawings. It should be understood that the embodiments described herein are merely illustrative and not restrictive.

Any numerical values (including the endpoints of the numerical ranges) disclosed herein are not limited to the precise value thereof, but should be understood to cover all values close to said precise value. Moreover, for the numerical ranges disclosed herein, one or more new numerical ranges can be obtained by combining the endpoints of the ranges, combining the endpoints with specific values within the ranges, or combining specific values within the ranges, and such new numerical ranges are also considered to be specifically disclosed herein.

The RIPP test methods involved in the present application can be found in "Petrochemical analysis methods", edited by Cuiding YANG et al., Science Press, September 1990, pages 263-268 and 303-304, ISBN: 7-03-001894-X.

In a first aspect, the present application provides a process for treating gasoline, comprising:

contacting a gasoline feedstock with a mixed catalyst and subjecting it to desulfurization and aromatization in the presence of hydrogen to obtain a desulfurization-aromatization product, wherein the mixed catalyst comprises an adsorption desulfurization catalyst and an aromatization catalyst, and at least about 50 wt %, preferably at least about 80 wt %, more preferably at least about 90 wt %, particularly preferably at least about 95 wt %, and most preferably about 100 wt % of the aromatization catalyst has undergone a passivation and/or aging treatment.

In certain preferred embodiments, the process further comprises the step of: subjecting at least a portion of the resulting desulfurization-aromatization product to distillation to obtain a $C_3$-$C_4$ liquid hydrocarbon component and a stabilized gasoline fraction. Preferably, the liquid hydrocarbon component is sent to a gas separation unit for further processing.

Optionally, the stabilized gasoline fraction can be used directly as a gasoline product or as a feedstock for other processes.

In some preferred embodiments, the process further comprises the following steps:

splitting at least a portion of the resulting desulfurization-aromatization product into a light gasoline fraction and a heavy gasoline fraction; and subjecting at least a portion of the resulting light gasoline fraction to etherification to obtain an etherified oil.

In some further preferred embodiments, the process further comprises the step of:

mixing at least a portion of the etherified oil with at least a portion of the heavy gasoline fraction to provide a gasoline product.

In a second aspect, the present application provides a process for treating gasoline, comprising:

1) contacting a gasoline feedstock with a mixed catalyst and subjecting it to desulfurization and aromatization in the presence of hydrogen to obtain a desulfurization-aromatization product;

2) splitting at least a portion of the resulting desulfurization-aromatization product into a light gasoline fraction and a heavy gasoline fraction;

3) subjecting at least a portion of the resulting light gasoline fraction to etherification to obtain an etherified oil; and 4) optionally, mixing at least a portion of the etherified oil with at least a portion of the heavy gasoline fraction to provide a gasoline product, wherein the mixed catalyst comprises an adsorption desulfurization catalyst and an aromatization catalyst, and the aromatization catalyst is selected from the group consisting of a fresh aromatization catalyst, a passivated aromatization catalyst, an aged aromatization catalyst, or any combination thereof.

As used herein, the term "desulfurization and aromatization" refers to a process in which a gasoline feedstock is subjected to desulfurization and the conversion of olefins to aromatic hydrocarbons by the combined action of an adsorption desulfurization catalyst and an aromatization catalyst in the presence of hydrogen, which may be accompanied by a cracking reaction. In certain preferred embodiments, the desulfurization and aromatization are carried out under conditions including: a reaction temperature within a range from about 350 to about 500° C., preferably from about 380 to about 420° C.; and a weight hourly space velocity within a range from about 2 h$^{-1}$ to about 50 h$^{-1}$, preferably from about 5 h$^{-1}$ to about 20 h$^{-1}$; a reaction pressure within a range from about 0.5 MPa to about 3.0 MPa, preferably from about 1.5 MPa to about 2.5 MPa; and a volume ratio of hydrogen to the gasoline feedstock (under standard conditions (STP) 0° C. (273 K), 1.01×10$^5$ Pa) within a range from about 1 to about 500, preferably from about 50 to about 200.

The adsorption desulfurization catalyst used in the present application is not particularly limited, and may be any catalyst known to those skilled in the art that is suitable for used in the adsorption desulfurization of gasoline. In some preferred embodiments, the adsorption desulfurization catalyst comprises silica, alumina, zinc oxide, and a desulfurization active metal, and the desulfurization active metal is at least one selected from the group consisting of cobalt, nickel, copper, iron, manganese, molybdenum, tungsten, silver, tin and vanadium.

In certain preferred embodiments, on the basis of oxides, the zinc oxide is present in an amount ranging from about 10% to about 90% by weight, the silica is present in an amount ranging from about 5% to about 85% by weight, and the alumina is present in an amount ranging from about 5% to about 30% by weight based on the dry weight of the adsorption desulfurization catalyst; and on the elemental basis, the desulfurization active metal is present in the adsorption desulfurization catalyst in an amount ranging from about 5% to about 30% by weight based on the dry weight of the adsorption desulfurization catalyst.

In a preferred embodiment, the adsorption desulfurization catalyst may further comprise about 1% to about 10% by weight of a coke-like material. Industrial practice shows that the carbon content on the adsorption desulfurization catalyst has an influence on the desulfurization efficiency of the adsorption desulfurization catalyst and the loss of the octane number of gasoline. With the increase of carbon content of the adsorption desulfurization catalyst, the desulfurization efficiency of the adsorption desulfurization catalyst is gradually decreased, and the loss of the octane number of gasoline is gradually reduced accordingly. Likewise, it is highly preferable that the adsorption desulfurization catalyst has a certain sulfur content. The practice shows that the sulfur content of a spent adsorption desulfurization catalyst is in a range from about 9% to about 10% by weight, the sulfur content of a regenerated adsorption desulfurization catalyst is in a range from about 5% to about 6% by weight, and it is most preferable that the difference in sulfur content between the spent adsorption desulfurization catalyst and the regenerated adsorption desulfurization catalyst is about 4% by weight.

As used herein, the term "aromatization catalyst" refers to a catalyst capable of converting a hydrocarbon such as an olefin or the like in a gasoline feedstock into an aromatic hydrocarbon, which generally comprises a molecular sieve, and preferably comprises a molecular sieve, a support, and a metal. In certain preferred embodiments, on dry basis, the aromatization catalyst comprises about 10% to about 30% by weight of a molecular sieve, about 0% to about 20% by weight of an aromatization active metal oxide and about 50% to about 90% by weight of a support, based on the total weight of the aromatization catalyst.

In certain further preferred embodiments, the molecular sieve comprises a Y molecular sieve and/or an MFI structural molecular sieve, preferably a five-membered high silica molecular sieve, which may be of the hydrogen type or may be modified by a rare earth metal and/or phosphorus, preferably having a silica-alumina ratio of greater than 100, more preferably greater than 150.

In certain further preferred embodiments, the aromatization active metal may show some desulfurization or hydrocarbon conversion capability, and may, for example, be at least one selected from the group consisting of metal elements of Group IVB, metal elements of Group VB, metal elements of Group VIB, metal elements of Group VIII, metal elements of Group IB, metal elements of Group IIB, and metal elements of Group IIIA. In certain still further preferred embodiments, the metal element of Group IVB is Zr or/and Ti, the metal element of Group VB is V, the metal element of Group VIB is Mo or/and W, the metal element of Group VIII is one or more selected from the group consisting of Fe, Co, and Ni, the metal element of Group IB is Cu, the metal element of Group IIB is Zn, and the metal element of Group IIIA is Ga. In some particularly preferred embodiments, the aromatization active metal is at least one selected from the group consisting of Fe, Zn and Ga, and its content is preferably within a range from about 0.5% to about 5% by weight.

In certain further preferred embodiments, the support preferably comprises silica and/or alumina.

In certain preferred embodiments, the aromatization catalyst typically has a particle size within a range from 20 to 120 microns, which is comparable to the particle size of the adsorption desulfurization catalyst. Preferably, in the present application, the adsorption desulfurization catalyst and the aromatization catalyst are separately formed (for example, by spray drying) and then mixed before use.

The ratio of the adsorption desulfurization catalyst to the aromatization catalyst in the mixed catalyst of the present application may vary depending on the olefin and sulfur content of the gasoline feedstock. In certain preferred embodiments, the percentage by weight of the aromatization catalyst in the mixed catalyst is within a range from about 1% to about 30% by weight, preferably from about 3% to about 15% by weight.

In certain preferred embodiments, the aromatization catalyst of the present application can be prepared in accordance with the following steps: mixing the starting material for preparing the aromatization catalyst with water to make a slurry, and then subjecting the slurry to spray-drying and calcination; wherein the starting material comprises about 15% to about 60% by weight of a natural mineral, about 10% to about 30% by weight of a precursor of an inorganic oxide binder, and about 20% to about 80% by weight of a MFI structural molecular sieve containing phosphorus and supported metal, based on the dry weight of the starting material.

In a further preferred embodiment, the starting material comprises about 20% to about 55% by weight of the natural mineral, about 12% to about 28% by weight of the precursor of the inorganic oxide binder and about 35% to about 70% by weight of the MFI structural molecular sieve containing phosphorus and supported metal, based on the dry weight of the starting material.

As used herein, the term "natural mineral" refers to a natural element or compound formed under the combined action of various substances in the earth's crust (called geological action), which has a characteristic and relatively fixed chemical composition that can be expressed by a chemical formula. For example, it may comprise at least one selected from the group consisting of kaolin clay, halloysite, montmorillonite, diatomaceous earth, attapulgite, sepiolite, indianite, hydrotalcite, bentonite, and rectorite.

As used herein, the term "inorganic oxide binder" refers to an inorganic oxide that acts as a binder in the catalyst, and may, for example, comprise at least one selected from the group consisting of silica, alumina, zirconia, titania and amorphous silica-alumina.

As used herein, the term "precursor of an inorganic oxide binder" refers to a starting material for preparing a catalytic cracking catalyst, which is generally used for producing an inorganic oxide binder in the catalytic cracking catalyst, and may, for example, comprise at least one selected from the group consisting of silica sol, alumina sol, peptized pseudo-boehmite, silica-alumina sol, and phosphorus-containing alumina sol.

As used herein, the term "supported metal" refers to a metal supported on a molecular sieve by a loading method, excluding aluminum and alkali metals such as sodium or potassium. The supported metal used in the present application is not particularly limited and may be zinc, gallium and/or iron, and may also include other metals.

In certain further preferred embodiments, the supported metal is zinc and/or gallium, and the natural mineral comprises at least one selected from the group consisting of kaolin clay, halloysite, montmorillonite, diatomaceous earth, attapulgite, sepiolite, indianite, hydrotalcite, bentonite, and rectorite, and the inorganic oxide binder comprises at least one selected from the group consisting of silica, alumina, zirconia, titania, and amorphous silica-alumina.

In certain still further preferred embodiments, the MFI structural molecular sieve is at least one selected from the group consisting of ZSM-5, ZSM-8, and ZSM-11.

In certain preferred embodiments, the MFI structural molecular sieve in the aromatization catalyst has a $n(SiO_2)/n(Al_2O_3)$ ratio of greater than about 100; the molecular sieve has a phosphorus content, on the basis of $P_2O_5$, within a range from about 0.1% to about 5% by weight, based on the dry weight of the molecular sieve; the molecular sieve has a supported-metal content, on the basis of oxides, within a range from about 0.5% to about 5% by weight, based on the dry weight of the molecular sieve; the Al distribution parameter D(Al) of the molecular sieve satisfies: $0.6 \leq D(Al) \leq 0.85$, wherein $D(Al)=Al(S)/Al(C)$, and Al(S) denotes the aluminum content in any region of greater than 100 square nanometers within an inward distance H from the edge of the crystal face of the molecular sieve grain determined by the TEM-EDS method (where TEM means transmission electron microscope, EDS means X-ray energy spectrum, and TEM-EDS means transmission electron microscope with X-ray energy spectrum); Al(C) denotes the aluminum content in any region of greater than 100 square nanometers within an outward distance H from the geometric center of the crystal face of the molecular sieve grain determined by the TEM-EDS method, wherein H denotes 10% of the distance from a certain point at the edge of the crystal face to the geometric center of the crystal face; the supported-metal distribution parameter D(M) of the molecular sieve satisfies: $2 \leq D(M) \leq 10$, where $D(M)=M(S)/M(C)$, and M(S) denotes the supported-metal content in any region of greater than 100 square nanometers within an inward distance H from the edge of the crystal face of the molecular sieve grain determined by the TEM-EDS method, M(C) denotes the supported-metal content in any region of greater than 100 square nanometers within an outward distance H from the geometric center of the crystal face of the molecular sieve grain determined by the TEM-EDS method; the molecular sieve has a mesopore volume percentage within a range from about 40% to about 80% relative to the total pore volume thereof, with the volume percentage of mesopores having a pore diameter within a range from about 2 nm to about 20 nm relative to the total mesopore volume being preferably greater than about 90%; and the molecular sieve has a percentage of strong acid content relative to the total acid content within a range from about 60% to about 80%, with a ratio of the Bronsted acid (B acid) content to the Lewis acid (L acid) content being within a range from about 15 to about 80.

In certain further preferred embodiments, the MFI structural molecular sieve has a $n(SiO_2)/n(Al_2O_3)$ ratio of greater than about 120; the molecular sieve has a phosphorus content, on the basis of $P_2O_5$, within a range from about 0.2% to about 4% by weight, based on the dry weight of the molecular sieve; the molecular sieve has a supported-metal content, on the basis of oxides, within a range from about 0.5% to about 3% by weight, based on the dry weight of the molecular sieve; the Al distribution parameter D(Al) of the molecular sieve satisfies: $0.65 \leq D(Al) \leq 0.8$; the supported-metal distribution parameter D(M) of the molecular sieve satisfies: $3 \leq D(M) \leq 6$; the molecular sieve has a mesopore volume percentage within a range from about 50% to about 70% relative to the total pore volume thereof, with the volume percentage of mesopores having a pore diameter within a range from about 2 nm to about 20 nm relative to the total mesopore volume being greater than about 92%; and the molecular sieve has a percentage of strong acid content relative to the total acid content within a range from about 65% to about 75%, with the ratio of the B acid content to the L acid content being within a range from about 20 to about 50.

The TEM-EDS method used in the present application for determining the aluminum content and the supported-metal content of the molecular sieve is well known to those skilled in the art, wherein the determination of the geometric center is also well known to those skilled in the art and can be calculated according to a formula, which will not be described herein in detail. The geometric center of a symmetrical figure is generally the intersection of the lines connecting the opposite vertices thereof. For example, the geometric center of the hexagonal crystal face of a conventional hexagonal ZSM-5 molecular sieve is at the intersection of the three lines connecting the opposite vertices thereof, where the crystal face is one face of a regular grain, and the inward and outward directions refer to the inward and outward directions on the crystal face.

According to the present application, the mesopore volume percentage of the molecular sieve relative to the total pore volume thereof is determined by the nitrogen adsorption BET specific surface area measuring method, wherein the mesopore volume refers to the volume of pores having a pore diameter greater than about 2 nm and less than about 100 nm; the percentage of strong acid content to the total acid content of the molecular sieve is determined by the $NH_3$-TPD method, wherein the acid center of the strong acid is specified as the acid center having a corresponding $NH_3$ desorption temperature of greater than 300° C.; the ratio of the B acid content to the L acid content is determined by the pyridine adsorption infrared acidity measuring method.

In certain preferred embodiments, the MFI structural molecular sieve containing phosphorus and supported metal can be prepared in accordance with the following steps:

a. subjecting a crystallized MFI structural molecular sieve slurry to filtration and washing, to obtain a water-washed molecular sieve, wherein the water-washed molecular sieve has a sodium content, on the basis of sodium oxide, of less than 3% by weight, based on the total dry weight of the water-washed molecular sieve;

b. subjecting the water-washed molecular sieve obtained in step a to desiliconization in an alkaline solution, and then to filtration and washing, to obtain a desiliconized molecular sieve;

c. subjecting the desiliconized molecular sieve obtained in step b to ammonium ion-exchange to obtain an ammonium ion-exchanged molecular sieve, wherein the ammonium ion-exchanged molecular sieve has a sodium content, on the basis of sodium oxide, of less than 0.2% by weight, based on the total dry weight of the ammonium ion-exchanged molecular sieve;

d. subjecting the ammonium ion-exchanged molecular sieve obtained in step c to dealumination in a composite acid dealuminant solution consisting of a fluorosilicic acid, an organic acid and an inorganic acid, and then to filtration and washing, to obtain a dealuminated molecular sieve;

e. subjecting the dealuminated molecular sieve obtained in the step d to phosphorus modification and loading of the supported metal, to obtain a modified molecular sieve; and f. subjecting the modified molecular sieve obtained in the step e to hydrothermal calcination to obtain the MFI structural molecular sieve containing phosphorus and supported metal.

The "crystallized MFI structural molecular sieve slurry" used in the step a of the present application can be obtained by methods well known to those skilled in the art, and will not be described herein in detail. In addition, the MFI structural molecular sieve is also well known to those skilled in the art, and may be obtained by amine-free crystallization, or may be a molecular sieve prepared by a templating method. The molecular sieve obtained by amine-free crystallization does not need to be calcined, while the molecular sieve prepared by the templating method needs to be calcined in air after drying, and the ZSM-5 molecular sieve normally has a silica-alumina ratio of less than 100.

The desiliconization performed using an alkaline solution in the step b of the present application is well known to those skilled in the art. For example, the alkaline solution used in the step b may be selected from the group consisting of sodium hydroxide solution and/or potassium hydroxide solution, preferably sodium hydroxide solution. The desiliconization conditions may include: a weight ratio on dry basis of the molecular sieve to the alkali in the alkaline solution within a range of about 1:(0.1-1), preferably about 1:(0.15-0.4); a desiliconization temperature within a range from room temperature to about 100° C., preferably from about 50 to about 85° C., a desiliconization time within a range from about 15 minutes to about 8 hours, preferably from about 30 minutes to about 4 hours.

The ammonium ion-exchange carried out in the step c of the present application is well known to those skilled in the art. For example, in step c, the alkali-treated desiliconized molecular sieve can be subjected to ion exchange at a temperature within a range from room temperature to about 100° C. for about 0.5 to about 2 hours with a weight ratio of the molecular sieve:ammonium salt:$H_2O$ within a range of about 1:(0.1-1):(5-10), and then to filtration, so as to provide a $Na_2O$ content of the zeolite of less than about 0.2% by weight. The ammonium salt may be any commonly used inorganic ammonium salt, for example, at least one selected from the group consisting of ammonium chloride, ammonium sulfate, and ammonium nitrate.

The "dealumination" treatment involved in the step d of the present application is known per se to those skilled in the art, but it has not been reported to use a combination of an inorganic acid, an organic acid and a fluorosilicic acid in the dealumination as in the step d of the present application. The dealumination may be carried out in one or more stages, in which the organic acid may be firstly mixed with the ammonium ion-exchanged molecular sieve, and then the fluorosilicic acid and the inorganic acid may be mixed with the ammonium ion-exchanged molecular sieve, that is, the organic acid may be firstly added into the ammonium ion-exchanged molecular sieve, and the fluorosilicic acid and the inorganic acid may then be slowly added in a co-current manner, or alternatively the fluorosilicic acid and the inorganic acid may be added successively, preferably the fluorosilicic acid and the inorganic acid are slowly added in a co-current manner. The dealumination can be carried out under the following conditions: a weight ratio on dry basis of the molecular sieve:fluorosilicic acid:organic acid:inorganic acid within a range of about 1:(0.02-0.5):(0.05-0.5):(0.05-0.5), preferably about 1:(0.05-0.3):(0.1-0.3):(0.1-0.3); a treatment temperature within a range from about 25 to about 100° C., and a treatment time within a range from about 0.5 to about 6 hours.

It has been proved via experimentation that, by using the composite acid system in the dealumination of the present application, the silica-alumina ratio of the molecular sieve can be effectively improved, the aluminum distribution can be adjusted, and the acid distribution can be improved while maintaining the crystal structure of the molecular sieve and the integrity of its pore structure of mesopores, under the synergistic action of the three acids.

The organic acid and the inorganic acid used in the step d of the present application may be those conventionally used in the art. For example, the organic acid may be at least one selected from the group consisting of ethylenediamine tetraacetic acid, oxalic acid, citric acid, and sulfosalicylic acid, preferably oxalic acid; and the inorganic acid may be at least one selected from the group consisting of hydrochloric acid, sulfuric acid and nitric acid, preferably hydrochloric acid.

The washing carried out in the step d of the present application is well known to those skilled in the art, and may be carried out, for example, by rinsing the filtered molecular sieve with about 5-10 times of water at about 30-60° C.

The phosphorus modification and the loading of the supported metal carried out in the step e of the present application are well known to those skilled in the art. For example, the phosphorus modification in the step e may comprise the step of subjecting the molecular sieve to impregnation and/or ion exchange with at least one phosphorus-containing compound selected from the group consisting of phosphoric acid, ammonium hydrogen phosphate, ammonium dihydrogen phosphate and ammonium phosphate; and the loading of the supported metal in the step e may comprise the steps of: dissolving a soluble salt containing at least one supported metal selected from the group consisting of zinc and gallium in deionized water, adjusting the pH with ammonia water to precipitate the supported metal in the form of hydroxide, and then mixing the resulting precipitate uniformly with the molecular sieve.

The hydrothermal calcination of the molecular sieve carried out in the step f of the present application is well known to those skilled in the art. For example, the hydrothermal calcination in the step f can be carried out under the following conditions: a calcination atmosphere of steam, a calcination temperature within a range from about 400 to about 800° C. and a calcination time within a range from about 0.5 to about 8 hours.

In certain preferred embodiments, the inventors of the present application have surprisingly found that a better effect can be obtained by using an aromatization catalyst having a micro-activity within a range from about 20 to about 55, which can be determined according to the test method of RIPP 92-90 in catalytic cracking field for determining the micro-activity of equilibrium catalysts, for which the details can be referred to the working examples. Generally, commercially available or self-made qualified fresh aromatization catalysts normally have a micro-activity above 60, and thus show a higher activity and a stronger cracking performance. Therefore, prior to use in the desulfurization and aromatization, such fresh aromatization catalysts are preferably subjected to a pre-treatment to reduce the acid content and increase the acid strength, thereby facilitating the reduction of the hydrogen transfer reaction.

In certain preferred embodiments, the aromatization catalyst has been subjected to passivation prior to use in the desulfurization and aromatization. Preferably, the passivation comprises the step of contacting the aromatization catalyst, such as a fresh aromatization catalyst, with a compound containing carbon, sulfur and/or nitrogen to conduct a passivation reaction.

In certain further preferred embodiments, the passivated aromatization catalyst comprises about 0.1% to about 5.0% by weight of passivated species, wherein the passivated species comprises at least one element selected from the group consisting of carbon, sulfur, and nitrogen.

In certain preferred embodiments, the passivation can be carried out in a reactor located outside of the desulfurization-aromatization reactor, or in the pre-lift segment of a fluidized reactor used as the desulfurization-aromatization reactor. The compound containing carbon, sulfur and/or nitrogen used for the passivation may be gasoline, hydrogen sulfide, carbon disulfide, ammonia, anilines, pyridines or quinolines, etc. The gasoline may be the gasoline feedstock used, or other gasoline from the outside, such as catalytic cracking gasoline, steam cracking gasoline or other olefin-containing gasoline.

In certain preferred embodiments, the aromatization catalyst is subjected to an aging treatment prior to use in the desulfurization and aromatization. As used herein, the term "aging" refers to a process in which the aromatization catalyst, such as a fresh aromatization catalyst, is subjected to a treatment at elevated temperature in the presence of steam to reduce its activity. In certain further preferred embodiments, the aging treatment is carried out under the following conditions: a temperature within a range from about 500 to about 800° C., preferably from about 600 to about 800° C., more preferably from about 700 to about 800° C.; an ageing time within a range from about 1 to about 360 hours, preferably from about 2 to about 48 hours, more preferably from about 4 to about 24 hours; and an aging atmosphere containing steam, preferably an atmosphere comprising about 100% steam.

In certain preferred embodiments of the aging treatment, the fresh aromatization catalyst is contacted with steam or an aging medium containing steam, and aged in a hydrothermal environment at a temperature within a range from about 500° C. to about 800° C. for about 1 hour to about 360 hours, to obtain an aged aromatization catalyst. In certain further preferred embodiments, the aging medium may comprise air, dry gas, regenerated flue gas, gas obtained after the combustion of a dry gas in air, gas obtained after the combustion of burning oil in air, or other gases such as nitrogen. Preferably, the weight fraction of steam in the aging medium containing steam is within a range from about 0.2 to about 0.9, more preferably from about 0.40 to about 0.60. Preferably, the regenerated flue gas may come from the catalyst regeneration unit of the present application or may come from a regeneration unit of other processes.

In certain preferred embodiments, the aging treatment is carried out in an aging reactor, preferably a dense phase fluidized bed. In certain further preferred embodiments, the aging treatment comprises the step of subjecting the fresh aromatization catalyst to aging at 800° C. under the condition of 100% steam for a time period within a range from 4 h to 17 h.

In certain preferred embodiments, at least about 50 wt %, preferably at least about 80 wt %, more preferably at least about 90 wt %, particularly preferably at least about 95 wt %, and most preferably about 100 wt % of the aromatization catalyst has undergone a passivation and/or aging treatment.

The desulfurization and aromatization of the present application are preferably carried out in a fluidized reactor to facilitate a rapid regeneration of the aromatization catalyst. In certain preferred embodiments, the fluidized reactor is selected from the group consisting of fluidized bed reactors, riser reactors, downer reactors, composite reactors composed of a riser reactor and a fluidized bed reactor, composite reactors composed of a riser reactor and a downer reactor, composite reactors composed of two or more riser reactors, composite reactors composed of two or more fluidized bed reactors, and composite reactors composed of two or more downer reactors, preferably a riser reactor, a fluidized bed reactor or a combination thereof. Preferably, each of the above reactors may be divided into two or more reaction zones. In certain preferred embodiments, the fluidized bed reactor is one or more selected from the group consisting of fixed fluidized bed, particularly fluidized bed, bubbling bed, turbulent bed, fast bed, transport bed, and dense phase fluidized bed reactors. The riser reactor is one or more selected from the group consisting of equal-diameter riser reactors, equal-linear-speed riser reactors, and various unequal-diameter riser reactors. In a particularly preferred embodiment, the fluidized reactor is a dense phase fluidized reactor.

The gasoline feedstock used in the present application may be any conventional gasoline feedstock commonly used in the art. In certain preferred embodiments, the gasoline feedstock may be at least one selected from the group consisting of catalytic cracking gasoline, deep catalytic cracking gasoline, coker gasoline, thermal cracking gasoline, and straight-run gasoline, or a fraction thereof. In certain preferred embodiments, the gasoline feedstock is a gasoline having a high olefin and sulfur content, of which the olefin volume fraction is generally greater than about 20% by volume, preferably greater than about 30% by volume, more preferably greater than about 40% by volume, and even more preferably greater than about 50% by volume; and the sulfur content is generally about 10 µg/g or above, preferably greater than about 50 µg/g, more preferably greater than about 100 µg/g, further preferably greater than about 500 µg/g, still more preferably greater than about 1000 µg/g. The organic sulfide in the gasoline feedstock is not particularly limited, and may be, for example, mercaptan, thioether, thiophene, allylthiophene, benzothiophene, and/or methylbenzothiophene.

The split point between the light gasoline fraction and the heavy gasoline fraction adopted in the present application may be varied as needed. In certain preferred embodiments, the split point between the light gasoline fraction and the heavy gasoline fraction is within a range from 60 to 80° C., more preferably from about 65 to about 70° C. In certain further preferred embodiments, the full-range gasoline is split in the fractionation column in accordance with the distillation range from low to high. More preferably, the fractionation column for splitting the gasoline is operated under the following conditions: an overhead temperature within a range from about 60 to about 80° C., a bottom temperature within a range from about 120 to about 160° C. and an operating pressure within a range from about 0.05 to about 0.3 MPa.

As used herein, the term "etherification" refers to a process in which a lower hydrocarbon (e.g., isopentene and cyclopentene) below C5 in the light gasoline fraction is subjected to an etherification reaction with an alcohol to produce a high-octane etherified oil. In certain preferred embodiments, the etherification comprises the step of contacting the light gasoline fraction with an alcohol to subject the olefin in the light gasoline fraction to an etherification reaction with the alcohol in the presence of an etherification catalyst, to obtain the etherified oil, wherein the etherification is carried out under the following conditions: a temperature within a range from about 20 to about 200° C., a pressure within a range from about 0.1 to about 5 MPa, a weight hourly space velocity within a range from about 0.1 to about 20 $h^{-1}$, and a molar ratio of the alcohol to the light gasoline fraction within a range of about 1:(0.1-100). In certain further preferred embodiments, the etherification catalyst comprises at least one selected from the group consisting of resins, molecular sieves, and heteropolyacids. In certain still further preferred embodiments, the alcohol is at least one selected from the group consisting of methanol, ethanol, and propanol.

In certain preferred embodiments of the etherification, a strongly acidic cation-exchange resin catalyst is charged in a one-stage etherification and/or two-stage etherification fixed bed reactor, and a light gasoline fraction that has undergone a pre-treatment such as desulfurization and removal of dienes is passed into the etherification fixed bed reactor to conduct an etherification reaction under the following conditions: a reaction temperature within a range from about 50 to about 90° C., a liquid hourly space velocity within a range from about 1.0 to about 3.0 $h^{-1}$, and a molar ratio of methanol to active olefins in the light gasoline fraction within a range from about 1 to about 2, the etherified product is sent to a rectification column for separation, an etherified oil is obtained at the bottom of the column, and unreacted light hydrocarbons and methanol are recycled. As used herein, the term "active olefin" refers to an olefin having a double bond at a tertiary carbon atom.

In certain further preferred embodiments, the etherification is carried out under the following conditions: a reaction temperature comprising an inlet temperature within a range from about 55 to about 60° C. and an outlet temperature of less than about 90° C., a space velocity within a range from about 1 to about 2 $h^{-1}$, and a molar ratio of methanol to active olefins in the light gasoline fraction within a range from about 1.2 to about 1.4. In some embodiments, the olefin content in one-stage etherification is relatively high, and a mixed-phase bed reactor is suitable for use therein; while the olefin content in two-stage etherification is relatively low, and an adiabatic fixed-bed reactor is suitable for use therein. In certain preferred embodiments, an isomerization unit can also be employed in the light gasoline etherification process. Light gasoline etherification has many advantages, such as reducing the olefin content of gasoline, increasing the octane number, lowering the vapor pressure, increasing the added value and enhancing the blending efficiency. The etherified oil can be used as a blending component for adjusting the octane number of gasoline, or can be mixed with the heavy gasoline fraction to provide a full-range gasoline product.

In certain preferred embodiments, the light gasoline fraction has been subjected to a pre-treatment prior to the etherification to remove impurities such as sulfur compounds and/or dienes, thereby prolonging the service life of the etherification catalyst. In certain further preferred embodiments, the pretreatment is at least one selected from the group consisting of alkaline liquid extraction, mercaptan conversion, and selective hydrotreatment. In certain still further preferred embodiments, the alkaline liquid extraction is used to remove mercaptan from the light gasoline fraction using an alkaline solution by extracting the mercaptan into the alkaline solution; the mercaptan conversion is used to remove small-molecule mercaptan by converting it into other sulfides, which can be carried out by a conventional alkali-free deodorization process, a pre-hydrogenation process, etc., wherein the catalyst and the cocatalyst used can be catalysts commonly used in the art. The selective hydrotreatment is well known to those skilled in the art, and is used to remove dienes from gasoline and allow the isomerization of 3-methyl-1-butene to 2-methyl-1-butene.

In the present application, since the light gasoline fraction has been subjected to desulfurization and aromatization prior to etherification, the above pretreatment is not essential and may be omitted in some embodiments.

In a third aspect, the present application provides a system for treating gasoline, comprising a desulfurization-aromatization reactor, a high pressure separator, a full-range gasoline fractionation column, and an etherification unit, wherein the desulfurization-aromatization reactor is provided with a gasoline feedstock inlet, a hydrogen inlet, and a desulfurization-aromatization product outlet, the full-range gasoline fractionation column is provided with a full-range gasoline inlet, a light gasoline fraction outlet, and a heavy gasoline fraction outlet; the desulfurization-aromatization product outlet of the desulfurization-aromatization reactor is in fluid communication with the full-range gasoline inlet of the full-range gasoline fractionation column via the high pressure separator; and the light gasoline fraction outlet of the full-range gasoline fractionation column is in fluid communication with an inlet of the etherification unit, wherein a gasoline feedstock is introduced into the desulfurization-aromatization reactor through the gasoline feedstock inlet, and subjected to desulfurization and aromatization therein in the presence of hydrogen to obtain a desulfurization-aromatization product; the desulfurization-aromatization product is separated in the high-pressure separator into a hydrogen-containing tail gas and a full-range gasoline, the full-range gasoline is introduced into the full-range gasoline fractionation column through the full-range gasoline inlet, and subjected to fractionation therein to obtain a light gasoline fraction and a heavy gasoline fraction; and the light gasoline fraction is introduced into the etherification unit, and subjected to etherification therein to obtain an etherified product.

In certain preferred embodiments, the system further comprises an etherification product fractionation column and a mixer, wherein the etherification product fractionation column is provided with an etherification product inlet, an alcohol-containing tail gas outlet, and an etherified oil outlet; an outlet of the etherification unit is in fluid communication with the etherification product inlet of the etherification product fractionation column, the etherified oil outlet of the etherification product fractionation column is in fluid communication with an inlet of the mixer; and the heavy gasoline fraction outlet of the full-range gasoline fractionation column is in fluid communication with an inlet of the mixer, wherein the etherification product is subjected to fractionation in the etherification product fractionation column to obtain an alcohol-containing tail gas and an etherified oil, and the etherified oil and the heavy gasoline fraction are mixed in the mixer to obtain a gasoline product.

In certain preferred embodiments, the gasoline feedstock inlet and the hydrogen inlet of the desulfurization-aromatization reactor are the same inlet.

A preferred embodiment of the process and system of the present application will now be described with reference to the drawings, with no limitation to the present invention.

As shown in FIG. 1, in a preferred embodiment, the system for treating gasoline according to the present application comprises: a desulfurization-aromatization reactor 3, a high pressure separator 5, a full-range gasoline fractionation column 8, a pretreatment unit 11, an etherification unit 14, an etherification product fractionation column 16 and a mixer 19, wherein the desulfurization-aromatization reactor 3 is provided with a gasoline feedstock inlet, a hydrogen inlet, and a desulfurization-aromatization product outlet, the full-range gasoline fractionation column 8 is provided with a full-range gasoline inlet, a light gasoline fraction outlet, and a heavy gasoline fraction outlet, the etherification product fractionation column 16 is provided with an etherification product inlet, an alcohol-containing tail gas outlet, and an etherified oil outlet; the desulfurization and aromatization product outlet of the desulfurization-aromatization reactor 3 is in fluid communication with the full-range gasoline inlet of the full-range gasoline fractionation column 8 via the high pressure separator 5; the light gasoline fraction outlet of the full-range gasoline fractionation column 8 is in fluid communication with the etherification product inlet of the etherification product fractionation column 16 through the pretreatment unit 11 and the etherification unit 14, successively, and the etherification oil outlet of the etherification product fractionation column 16 is in fluid communication with an inlet of the mixer 19; and the heavy gasoline fraction outlet of the full-range gasoline fractionation column 8 is in fluid communication with an inlet of the mixer 19.

In the preferred embodiment shown in FIG. 1, the process of the present application comprises the steps of mixing a gasoline feedstock 1 having a high olefin and sulfur content with hydrogen 2, and feeding it to a desulfurization-aromatization reactor 3, where it is contacted with an adsorption desulfurization catalyst and an aromatization catalyst for adsorption desulfurization and aromatization. After the reaction, the desulfurization-aromatization product 4 is introduced into the high pressure separator 5, producing a low sulfur full-range gasoline 7 and a hydrogen containing tail gas 6. The full-range gasoline 7 is introduced into the full-range gasoline fractionation column 8 for fractionation, to obtain a light gasoline fraction 9 and a low sulfur heavy gasoline fraction 10. The light gasoline fraction 9 is subjected to a pretreatment such as desulfurization or the like in the pretreatment unit 11 to obtain a pre-etherification light gasoline 12, which is then mixed with an alcohol-containing stream 13 and introduced into the etherification unit 14 for reaction. The etherification product 15 is subjected to fractionation in the etherification product fractionation column 16 to obtain an etherified oil 18 and an alcohol-containing tail gas 17. The heavy gasoline fraction 10 is mixed with the etherified oil 18 in the mixer 19 to obtain a high-octane clean gasoline product 20.

EXAMPLES

The present application will be further illustrated with reference to the following working examples, without however limiting the present application.

Methods for Measurement

In the present application, the degree of crystallinity is determined according to the standard method of ASTM D5758-2001 (2011) e1.

In the present application, the silica-alumina ratio, $n(SiO_2)/n(Al_2O_3)$, is calculated based on the contents of silica and alumina, and the contents of silica and alumina are determined according to the standard method of GB/T 30905-2014.

In the present application, the phosphorus content is determined according to the standard method of GB/T 30905-2014, the content of the supported metal is determined according to the standard method of GB/T 30905-2014, and the sodium content is determined according to the standard method of GB/T 30905-2014.

For the TEM-EDS measurement method used in the present application, see "Research Technique for Solid Catalysts", Yongfang XUE, Petrochemicals, 29(3), 2000: pages 227-235.

In the present application, the total specific surface area ($S_{BET}$), the mesopore volume, the total pore volume, and the volume of mesopores having a diameter of 2-20 nm are determined as follows.

The AS-3, AS-6 Static Nitrogen Adsorbers manufactured by Quantachrome Instruments were used for measurement. Instrument parameters: The sample was placed in a sample treating system, evacuated to $1.33 \times 10^{-2}$ Pa at 300° C., and kept at the temperature and pressure for 4 h to purify the sample. The adsorption amount and desorption amount of nitrogen in the purified sample at a liquid nitrogen temperature of −196° C. under different specific pressure $P/P_0$ conditions were tested, and an $N_2$ adsorption-desorption isotherm curve was obtained. Then, the two-parameter BET equation was used to calculate the total specific surface area, the specific surface area of micropores and the specific surface area of mesopores. The adsorption amount under the specific pressure $P/P_0=0.98$ was recorded as the total pore volume of the sample, and the pore size distribution of mesopores was calculated according to the BJH equation and the mesopore volume (2-100 nm) and the volume of mesopores having a diameter of 2-20 nm were calculated using the integral method.

In the present application, the method for determining the B acid content and the L acid content is as follows.

The FTS3000 type Fourier Infrared Spectrometer manufactured by American BIO-RAD company was used for measurement.

Test conditions: The sample was compressed into tablets and placed in an in-situ bath of the infrared spectrometer and sealed, evacuated to $10^{-3}$ Pa at 350° C., and held for 1 h to allow a complete desorption of the gas molecules on the surface of the sample, and then cooled to room temperature. Pyridine vapor at a pressure of 2.67 Pa was introduced into the in-situ bath, equilibrated for 30 min, warmed to 200° C., evacuated again to $10^{-3}$ Pa, held for 30 min, cooled to room temperature, and scanned within the wavenumber range of 1400-1700 $cm^{-1}$. The infrared spectrum of the pyridine adsorption at 200° C. was recorded. The sample in the infrared absorption cell was moved to a heat treatment zone, heated to 350° C., evacuated to $10^{-3}$ Pa, held for 30 min, and cooled to room temperature. The infrared spectrum of the pyridine adsorption at 350° C. was recorded. The B acid content and the L acid content can be obtained via automatic integration by the instrument.

In the present application, the method for determining the total acid content and the strong acid content is as follows.

The Autochem 112920 Temperature Programming Desorber of Micromeritics Instrument Corporation, USA, was used for measurement.

Test conditions: 0.2 g of the sample to be tested was weighed into a sample tube, placed in a thermal conductivity cell heating device, with He gas being used as the carrier gas (50 mL/min), heated up to 600° C. at a heating rate of 20° C./min, and purged for 60 min to drive off impurities adsorbed on the surface of the catalyst. Then, the sample was cooled to 100° C., kept at the temperature for 30 min, switched to a $NH_3$—He gas mixture (10.02% $NH_3$+89.98% He) for adsorption for 30 min, and then purged with He gas for 90 min until the baseline was stable to desorb the physically adsorbed ammonia gas. The sample was heated to 600° C. at a heating rate of 10° C./min for desorption, and held for 30 min. Then, the desorption was stopped. The TCD detector was used to detect the change of the gas composition, and the total acid content and the strong acid content were obtained via automatic integration by the instrument. The acid center of the strong acid was specified as the acid center having a corresponding $NH_3$ desorption temperature of greater than 300° C.

In the present application, the D value is calculated as follows.

In the TEM, a crystal grain was selected, which had a crystal face forming a polygon that had a geometric center, an edge, and a distance H that was 10% of the distance from the geometric center to a certain point at the edge (i.e. different points at the edge having different H values). A region of greater than 100 square nanometers within an inward distance H from the edge of the crystal face, and another region of greater than 100 square nanometers within an outward distance H from the geometric center of the crystal face were arbitrarily selected, the aluminum content therein was determined, respectively, as Al(S1) and Al($C_1$), and a calculation was conducted according to the equation D(Al)=Al(S1)/Al($C_1$). Five different crystal grains were selected and measured, and the average value was calculated and recorded as D(Al). The method for determining D(M) is similar to the above method for determining D(Al).

In the present application, the dry weight is determined as follows.

The molecular sieve or catalyst to be tested was placed in a muffle furnace and calcined in an air atmosphere at 600° C. for 3 hours, and the resulting calcined product was cooled to room temperature in a closed drying dish, and then weighed.

The adsorption desulfurization catalysts used in the following examples and comparative examples were produced by the Catalyst Branch of China Petroleum & Chemical Corporation under the trade name FCAS. The aromatization catalysts used included a laboratory-made catalyst, named OTAZ-C-3, and a commercial aromatization catalyst available from the Catalyst Branch of China Petroleum & Chemical Corporation under the trade name MP051. The properties of each catalyst used in the examples are shown in Table 1.

TABLE 1

Properties of each catalyst used in the examples

| | Catalyst | | |
|---|---|---|---|
| | FCAS | OTAZ-C-3 | MP051 |
| Chemical composition, wt % | | | |
| Alumina | 13 | 50.3 | 50.8 |
| Sodium oxide | / | / | / |
| Nickel oxide | 21 | / | / |
| Zinc oxide | 52 | / | / |
| Gallium oxide | / | 1.5 | / |
| Silica | 14 | 48.14 | 48.7 |
| Apparent density, kg/$m^3$ | 1010 | 800 | 790 |

TABLE 1-continued

Properties of each catalyst used in the examples

| | Catalyst | | |
|---|---|---|---|
| | FCAS | OTAZ-C-3 | MP051 |
| Pore volume, mL/g | / | 0.27 | 0.23 |
| Specific surface area, m$^2$/g | / | 218 | 215 |
| Abrasion index, wt % · h$^{-1}$ | / | 1.5 | 1.4 |
| Size distribution, wt % | | | |
| 0-40 μm | 14.5 | 13.9 | 15 |
| 40-80 μm | 51.9 | 49.5 | 50.5 |
| >80 μm | 33.6 | 36.6 | 34.5 |
| Micro-activity | / | 80 | 80 |

The process for preparing the aromatization catalyst OTAZ-C-3 is as follows.

The starting materials used included kaolin clay (available from China Kaolin Clay Co., Ltd of Suzhou, solid content: 75% by weight), and pseudo-boehmite (available from Shandong Aluminum Co., Ltd., solid content: 65% by weight, peptized with a hydrochloric acid solution having a concentration of 31% by weight before use, the molar ratio of hydrochloric acid to the pseudo-boehmite, on the basis of alumina, being 0.20).

The crystallized ZSM-5 molecular sieve (available from Qilu Catalyst Branch, produced by amine-free method, n(SiO$_2$)/n(Al$_2$O$_3$)=27) was filtered off the mother liquor, washed with water until the Na$_2$O content was less than 3.0% by weight, and filtered to obtained a filter cake. 100 g (dry basis) of the above molecular sieve was added to 1000 g of 2.0% NaOH solution, heated to 65° C., reacted for 30 min, rapidly cooled to room temperature, filtered, and washed until the filtrate was neutral. Then, the filter cake was added to 800 g of water to make a slurry, to which 40 g of NH$_4$Cl was added, and the mixture was heated to 75° C. After 1 hour of ion exchange, an Na$_2$O content less than 0.2% by weight was obtained. The resultant was filtered, and washed to obtain a molecular sieve filter cake. 50 g (dry basis) of the above molecular sieve was added with water to produce a molecular sieve slurry with a solid content of 10% by weight. 11 g of oxalic acid was added with stirring, and then 110 g of hydrochloric acid (10% by mass) and 92 g of fluorosilicic acid (3% by mass) were added co-currently within 30 min. The resultant was heated to 65° C. and stirred at a constant temperature for 1 h, filtered and washed with water until the filtrate was neutral. The filter cake was added with water to make a molecular sieve slurry having a solid content of 45% by weight. 1.2 g of H$_3$PO$_4$ (having a concentration of 85% by weight) and 3.3 g of Zn(NO$_3$)$_2$·6H$_2$O were dissolved in 10 g of water, added with ammonia water to provide a pH of 6, and then added to the molecular sieve slurry and mixed uniformly. The mixture was dried, and calcined at 550° C. for 2 h under 100% steam atmosphere to obtain a molecular sieve A, the properties of which are listed in Table 2.

The pseudo-boehmite was mixed with the kaolin clay and formulated into a slurry having a solid content of 30% by weight with deionized water, and stirred uniformly, and the pH of the slurry was adjusted to 2.5 with hydrochloric acid. The mixture was held at the pH and allowed to stand at 50° C. for 1 hour for aging, and stirred for another 1 hour to form a colloid. The prepared molecular sieve A and water were added to form a catalyst slurry (solid content of 35% by weight). The stirring was continued, followed by spray drying to obtain a microsphere catalyst. The microsphere catalyst was then calcined at 500° C. for 1 hour to obtain the aromatization catalyst OTAZ-C-3 used in the present application, which had a dry basis composition of 25% by weight of kaolin clay, 25% by weight of pseudo-boehmite and 50% by weight of the molecular sieve A.

TABLE 2

Properties of the molecular sieve A

| Item | Molecular sieve A |
|---|---|
| Degree of crystallinity/% | 90 |
| n(SiO$_2$)/n(Al$_2$O$_3$) | 110 |
| P$_2$O$_5$ content/% | 1.5 |
| Content of supported metal oxide/% | 1.6 |
| S$_{BET}$/(m$^2$/g) | 440 |
| (V$_{mesopore}$V$_{total\ pore}$)/% | 60 |
| (V$_{2nm-20nm}$/V$_{mesopore}$)/% | 99 |
| (Strong acid content/total acid content)/% | 70 |
| B acid content/L acid content | 35 |
| D(Al) | 0.77 |
| D(M) | 3.6 |

The passivation of the aromatization catalyst is performed as follows.

1. The fresh aromatization catalyst OTAZ-C-3 was charged into a dense-phase fluidized bed reactor, and contacted with stabilized gasoline A at a passivation temperature of 410° C. for 2 hours to obtain a passivated OTAZ-C-3 catalyst having a content of passivated species of 0.5% by weight and a micro-activity of 35.

2. The fresh aromatization catalyst MP051 was charged into a dense-phase fluidized bed reactor, and contacted with stabilized gasoline A at a passivation temperature of 410° C. for 2 hours to obtain a passivated MP051 catalyst having a content of passivated species of 0.5% by weight and a micro-activity of 35.

The aging treatment of the aromatization catalyst is performed as follows.

1. The fresh aromatization catalyst OTAZ-C-3 was charged into a dense-phase fluidized bed reactor, and continuously aged for 8 hours under an aging temperature of 780° C. and 100% steam atmosphere to obtain an aged OTAZ-C-3 catalyst with a micro-activity of 40.

2. The fresh aromatization catalyst MP051 was charged into a dense-phase fluidized bed reactor and continuously aged for 8 hours under an aging temperature of 780° C. and 100% steam atmosphere to obtain an aged MP051 catalyst with a micro-activity of 40.

In each example and comparative example of the present application, the contents of Na$_2$O, NiO, ZnO, Ga$_2$O$_3$, Al$_2$O$_3$, and SiO$_2$ in the catalysts were determined by the X-ray fluorescence method according to GB/T 30905-2014.

In each example and comparative example of the present application, the content of the passivated species in the passivated aromatization catalyst was determined according to the RIPP 107-90 method, of which the steps are summarized as follows: the sample was burned in a high frequency furnace to generate CO$_2$ and CO gases, and the gases were introduced into an infrared detector through a filter drier to obtain a total carbon content expressed in percentage. Since the catalyst itself had no induction effect, it was necessary to add a sensing agent, a fluxing agent to promote the burning of the sample; and since the sample was porous and had a water absorption capability, it was necessary to be pretreated before the test. Particularly, the test procedure included:

1. Test preparation: Preheating, cleaning, leak testing and checking of the circuit were performed according to the operation procedures of CS-46 Carbon Sulfur Tester (manufactured by American LECO company). The catalyst sample was baked at 110° C. for 2-3 hours and then cooled to room temperature in a desiccator.

2. Testing: A standard copper sample was burned, the C % value was checked, and the reading was adjusted to be within the error range. A crucible was placed on an electronic balance, and the reading was reset to zero. 0.3-0.4 g of the baked catalyst sample was added, and the sample weight was automatically input to the tester. The crucible was removed, added with a tin foil and then put back on the electronic balance, and the reading was reset to zero. 1.5-1.6 g of copper flux (available from Shandong Metallurgical Research Institute) was added. The crucible was removed and covered with a cap, and then put on a burning seat with crucible tongs. After burning for 30 seconds, the reading indicator light was on, and the C % value was recorded. Each sample was assayed for two times. The carbon blank value for this test was determined by the same procedure. The carbon content of the catalyst was calculated as follows: C %=C % of the sample−the blank C %.

In each example and comparative example of the present application, the micro-activity of the aromatization catalyst was determined according to the RIPP 92-90 method, using the same equipment and test procedure as ASTM D3907-2013, under the following conditions: feedstock oil: Dagang straight-run diesel having a relative density $d_4^{20}$ of 0.8419, an initial boiling point of 235° C., a dry point of 337° C.; reaction conditions: an oil intake of 1.56 g, a reaction temperature of 460° C., a catalyst-to-oil mass ratio of 3.2, a weight hourly space velocity of the feedstock oil of 16 $h^{-1}$ and a feed time of 70 seconds.

In each example and comparative example of the present application, the octane number RON and MON of gasoline were determined according to the standard methods of GB/T 5487-1995 and GB/T 503-1995, respectively, and the anti-knock index was calculated by (MON+RON)/2, the PONA of gasoline was analyzed by simulated distillation and the hydrocarbon composition analysis of gasoline (determined according to the test methods of ASTM D2887 and ASTM D6733-01 (2011), respectively), and the sulfur content of gasoline was determined according to SH/T0689-2000.

The gasoline feedstock used in the following examples and comparative examples was Stabilized Gasoline A, the properties of which are listed in Table 3 below:

TABLE 3

Properties of the gasoline feedstock used in the examples

| | Stabilized gasoline A |
|---|---|
| Gasoline feedstock | |
| Density at 20° C., kg/m³ | 737.3 |
| Refractive index at 20° C. | 1.4212 |
| Vapor pressure (RVPE), kPa | 49 |
| Carbon content, % (w) | 86.36 |
| Hydrogen content, % (w) | 13.64 |
| Sulfur content, mg/L | 421 |
| Nitrogen content, mg/L | 139 |
| Induction period, min | 667 |
| Group composition (FIA method) | |
| Aromatics, % (by volume) | 15.4 |
| Olefins, % (by volume) | 54.9 |
| Saturated hydrocarbons, % (by volume) | 29.7 |
| Measured RON | 90.9 |
| Measured MON | 78.9 |
| (RON + MON)/2 | 84.9 |

TABLE 3-continued

Properties of the gasoline feedstock used in the examples

| | Stabilized gasoline A |
|---|---|
| Distillation range under normal pressure, ° C. | |
| IBP | 44 |
| 5% (φ) | 59 |
| 10% (φ) | 63 |
| 30% (φ) | 80 |
| 50% (φ) | 106 |
| 70% (φ) | 139 |
| 90% (φ) | 175 |
| FBP | 204 |

The following Examples I-1 to I-10 are working examples in which the above-mentioned gasoline feedstock was subjected to desulfurization and aromatization using various types of catalysts, and the results are shown in Table 4.

Example I-1

The gasoline feedstock was contacted with a mixed catalyst comprising the adsorption desulfurization catalyst FCAS and the passivated OTAZ-C-3 catalyst in a small continuous fluidized bed reactor for adsorption desulfurization and aromatization, in which the OTAZ-C-3 catalyst was present in an amount of 7% by weight based on the total weight of the mixed catalyst.

The operating conditions were as follows: a reaction temperature of 400° C., a reactor pressure of 2.1 MPa, a weight hourly space velocity of the gasoline feedstock of 6 $h^{-1}$, and a volume ratio of hydrogen to the gasoline feedstock of 75. The desulfurization-aromatization product obtained from the top of the reactor was cooled to about 10° C., and separated to obtain a gas product and a full-range gasoline, and the full-range gasoline was taken as a gasoline product without being subjected to splitting or etherification, the properties of which are shown in Table 4. The regeneration temperature of the mixed catalyst was 550° C., and, after the regeneration, the mixed catalyst was returned to the reactor for recycling.

Example I-2

The operation was substantially the same as in Example I-1, except that the passivated OTAZ-C-3 catalyst was replaced with an equivalent weight of the aged OTAZ-C-3 catalyst, and the full-range gasoline was taken as a gasoline product without being subjected to splitting or etherification, the properties of which are shown in Table 4.

Example I-3

The operation was substantially the same as in Example I-1, except that the passivated OTAZ-C-3 catalyst was replaced with an equivalent weight of fresh OTAZ-C-3 catalyst, and the full-range gasoline was taken as a gasoline product without being subjected to splitting or etherification, the properties of which are shown in Table 4.

Example I-4

The operation was substantially the same as in Example I-1, except that the passivated OTAZ-C-3 catalyst was replaced with an equivalent weight of a mixed OTAZ-C-3 catalyst (comprising 5% by weight of a passivated catalyst and 2% by weight of a fresh catalyst, based on the total weight of the mixed catalyst of the adsorption desulfurization catalyst and the aromatization catalyst), and the full-range gasoline was taken as a gasoline product without being subjected to splitting or etherification, the properties of which are shown in Table 4.

Example I-5

The operation was substantially the same as in Example I-1, except that the passivated OTAZ-C-3 catalyst was replaced with an equivalent weight of a mixed OTAZ-C-3 catalyst (comprising 5% by weight of an aged catalyst and 2% by weight of a fresh catalyst, based on the total weight of the mixed catalyst of the adsorption desulfurization catalyst and the aromatization catalyst), and the full-range gasoline was taken as a gasoline product without being subjected to splitting or etherification, the properties of which are shown in Table 4.

Example I-6

The operation was substantially the same as in Example I-1, except that the passivated OTAZ-C-3 catalyst was replaced with an equivalent weight of the passivated MP051 catalyst, and the full-range gasoline was taken as a gasoline product without being subjected to splitting or etherification, the properties of which are shown Table 4.

Example I-7

The operation was substantially the same as in Example I-1, except that the passivated OTAZ-C-3 catalyst was replaced with an equivalent weight of the aged MP051 catalyst, and the full-range gasoline was taken as a gasoline product without being subjected to splitting or etherification, the properties of which are shown in Table 4.

Example I-8

The operation was substantially the same as in Example I-1, except that the passivated OTAZ-C-3 catalyst was replaced with an equivalent weight of the fresh MP051 catalyst, and the full-range gasoline was taken as a gasoline product without being subjected to splitting or etherification, the properties of which are shown in Table 4.

Example I-9

The operation was substantially the same as in Example I-1, except that the passivated OTAZ-C-3 catalyst was replaced with an equivalent weight of a mixed MP051 catalyst (comprising 5% by weight of a passivated catalyst and 2% by weight of a fresh catalyst, based on the total weight of the mixed catalyst of the adsorption desulfurization catalyst and the aromatization catalyst), and the full-range gasoline was taken as a gasoline product without being subjected to splitting or etherification, the properties of which are shown in Table 4.

Example I-10

The operation was substantially the same as in Example I-1, except that the passivated OTAZ-C-3 catalyst was replaced with an equivalent weight of a mixed MP051 catalyst (comprising 5% by weight of an aged catalyst and 2% by weight of a fresh catalyst, based on the total weight of the mixed catalyst of the adsorption desulfurization catalyst and the aromatization catalyst), and the full-range gasoline was taken as a gasoline product without being subjected to splitting or etherification, the properties of which are shown in Table 4.

Comparative Example I-1

The operation was substantially the same as in Example I-1, except that the passivated OTAZ-C-3 catalyst was replaced with an equivalent weight of the adsorption desulfurization catalyst FCAS, and the full-range gasoline was taken as a gasoline product without being subjected to splitting or etherification, the properties of which are shown in Table 4.

TABLE 4

Results of Examples I-1 to I-10 and Comparative Example I-1

| | Example Nos. | | | | |
|---|---|---|---|---|---|
| | I-1 | I-2 | I-3 | I-4 | I-5 |
| Name of the aromatization catalyst | OTAZ-C-3 | OTAZ-C-3 | OTAZ-C-3 | OTAZ-C-3 | OTAZ-C-3 |
| Type of the aromatization catalyst | Passivated | Aged | Fresh | Mixed | Mixed |
| Micro-activity of the aromatization catalyst | 35 | 40 | 80 | 48 | 48 |
| Etherification (Yes/No) | No | No | No | No | No |
| Gasoline yield relative to the feedstock, % | 99 | 99 | 98 | 99 | 99 |
| Density at 20° C., kg/m$^3$ | 736 | 736.5 | 735.2 | 737.8 | 737.6 |
| Refractive index at 20° C. | 1.4108 | 1.4112 | 1.4102 | 1.4143 | 1.4143 |
| Vapor pressure (RVPE), kPa | 61 | 61 | 83 | 65 | 65 |
| Carbon content, % (w) | 86 | 85.9 | 85.9 | 85.8 | 85.8 |
| Hydrogen content, %(w) | 14 | 14 | 14.1 | 14.2 | 14.2 |
| Sulfur content, mg/L | 15 | 15 | 9 | 12 | 12 |
| Nitrogen content, mg/L | 57 | 57 | 52 | 57 | 57 |
| Induction period, min | >1000 | >1000 | >1000 | >1000 | >1000 |
| Benzene, % (by volume) | 0.3 | 0.3 | 0.3 | 0.3 | 0.3 |

TABLE 4-continued

Results of Examples I-1 to I-10 and Comparative Example I-1

| Group composition (FIA method) | | | | | |
|---|---|---|---|---|---|
| Aromatics, % (by volume) | 19.1 | 18.5 | 19 | 20.8 | 20.8 |
| Olefins, % (by volume) | 31.3 | 31.1 | 29.8 | 29.4 | 29.2 |
| Saturated hydrocarbons, % (by volume) | 50.6 | 50.8 | 51.2 | 49.8 | 50 |
| RON | 89.5 | 89.5 | 89 | 89.3 | 89.3 |
| MON | 78.5 | 78.5 | 78.2 | 78.5 | 78.5 |
| (RON + MON)/2 | 84 | 84 | 83.6 | 83.9 | 83.9 |
| Change in antiknock index | −0.9 | −0.9 | −1.3 | −1 | −1 |
| Distillation range under normal pressure, ° C. | | | | | |
| IBP | 32 | 33 | 30 | 35 | 35 |
| 5% ($\varphi$) | 50 | 52 | 48 | 52 | 52 |
| 10% ($\varphi$) | 60 | 61 | 58 | 61 | 61 |
| 30% ($\varphi$) | 72 | 72 | 71 | 80 | 80 |
| 50% ($\varphi$) | 90 | 90 | 90 | 98 | 98 |
| 70% ($\varphi$) | 121 | 123 | 120 | 126 | 126 |
| 90% ($\varphi$) | 166 | 167 | 166 | 170 | 170 |
| FBP | 198 | 199 | 198 | 201 | 201 |

| | Example Nos. | | | | | |
|---|---|---|---|---|---|---|
| | I-6 | I-7 | I-8 | I-9 | I-10 | Comp. Ex. I-1 |
| Name of the aromatization catalyst | MP051 | MP051 | MP051 | MP051 | MP051 | None |
| Type of the aromatization catalyst | Passivated | Aged | Fresh | Mixed | Mixed | / |
| Micro-activity of the aromatization catalyst | 35 | 40 | 80 | 48 | 48 | / |
| Etherification (Yes/No) | No | No | No | No | No | No |
| Gasoline yield relative to the feedstock, % | 99 | 99 | 98 | 98.8 | 98.8 | 99.3 |
| Density at 20° C., kg/m$^3$ | 737.9 | 737.6 | 736.5 | 737.8 | 737.6 | 739.2 |
| Refractive index at 20° C. | 1.4146 | 1.4128 | 1.4112 | 1.4143 | 1.4143 | 1.4133 |
| Vapor pressure (RVPE), kPa | 62 | 64 | 83 | 67 | 67 | 50 |
| Carbon content, % (w) | 85.7 | 85.7 | 85.97 | 85.8 | 85.8 | 86.2 |
| Hydrogen content, %(w) | 14.3 | 14.3 | 14.03 | 14.2 | 14.2 | 13.8 |
| Sulfur content, mg/L | 13 | 13 | 13 | 12 | 12 | 15 |
| Nitrogen content, mg/L | 55 | 55 | 55 | 57 | 57 | 57 |
| Induction period, min | >1000 | >1000 | >1000 | >1000 | >1000 | >1000 |
| Benzene, % (by volume) | 0.3 | 0.3 | 0.3 | 0.3 | 0.3 | 0.3 |
| Group composition (FIA method) | | | | | | |
| Aromatics, % (by volume) | 19.5 | 20.2 | 20.2 | 20.8 | 20.8 | 17.5 |
| Olefins, % (by volume) | 31.1 | 28.7 | 26.6 | 28.4 | 28.2 | 31.5 |
| Saturated hydrocarbons, % (by volume) | 49.4 | 51.1 | 53.2 | 50.8 | 51 | 51 |
| RON | 89 | 89 | 88.4 | 89 | 89 | 87 |
| MON | 78.1 | 78.1 | 78 | 78.1 | 78.1 | 77.8 |
| (RON + MON)/2 | 83.55 | 83.55 | 83.2 | 83.55 | 83.55 | 82.4 |
| Change in antiknock index | −1.35 | −1.35 | −1.7 | −1.35 | −1.35 | −2.5 |
| Distillation range under normal pressure, ° C. | | | | | | |
| IBP | 35 | 35 | 30 | 35 | 35 | 45 |
| 5% ($\varphi$) | 54 | 54 | 50 | 52 | 52 | 60 |
| 10% ($\varphi$) | 62 | 62 | 60 | 61 | 61 | 66 |
| 30% ($\varphi$) | 81 | 81 | 72 | 80 | 80 | 83 |
| 50% ($\varphi$) | 100 | 100 | 90 | 98 | 98 | 102 |
| 70% ($\varphi$) | 129 | 129 | 121 | 126 | 126 | 139 |
| 90% ($\varphi$) | 173 | 173 | 166 | 170 | 170 | 173 |
| FBP | 205 | 205 | 198 | 201 | 201 | 203 |

As shown in Table 4, in the case where the full-range gasoline was taken as a gasoline product without being subjected to splitting or etherification, in Comparative Example I-1, when the gasoline feedstock was treated using the adsorption desulfurization catalyst FCAS only, that is, only adsorption desulfurization was carried out, the octane number (antiknock index) of the resulting gasoline product was significantly lower than that of the gasoline feedstock. In Examples I-6 to I-10, when the gasoline feedstock was treated using a mixed catalyst comprising the adsorption desulfurization catalyst FCAS and the aromatization catalyst MP051, that is, both adsorption desulfurization and aromatization were carried out, the octane number of the resulting gasoline product was improved as compared to Comparative Example I-1. Particularly, when an aromatization catalyst comprising a passivated or aged MP051 catalyst was used, the improvement was more remarkable. Further, in Examples I-1 to I-5, when the gasoline feedstock was treated using a mixed catalyst comprising the adsorption desulfurization catalyst FCAS and the aromatization catalyst OTAZ-C-3, the octane number of the resulting gasoline product was further improved as compared to Examples I-6 to I-10. Similarly, when an aromatization catalyst comprising a passivated or aged OTAZ-C-3 catalyst was used, the improvement was more remarkable.

The following Examples II-1 to II-3 are working examples in which the gasoline feedstock was subjected to desulfurization and aromatization using various types of catalysts, followed by the splitting of the full-range gasoline and the etherification of the light gasoline fraction. The results are shown in Table 6.

Example II-1

The gasoline feedstock was contacted with a mixed catalyst comprising the adsorption desulfurization catalyst FCAS and the passivated OTAZ-C-3 catalyst in a small continuous fluidized bed reactor for adsorption desulfurization and aromatization, in which the OTAZ-C-3 catalyst was present in an amount of 7% by weight based on the total weight of the mixed catalyst.

The operating conditions were as follows: a reaction temperature of 400° C., a reactor pressure of 2.1 MPa, a weight hourly space velocity of the gasoline feedstock of 6 $h^{-1}$, and a volume ratio of hydrogen to the gasoline feedstock of 75. The desulfurization-aromatization product obtained from the top of the reactor was cooled to about 10° C., and separated to obtain a tail gas and a full-range gasoline. The regeneration temperature of the mixed catalyst was 550° C., and, after the regeneration, the mixed catalyst was returned to the reactor for recycling.

The full-range gasoline was distilled in a fractionation column, split into a light gasoline fraction and a low sulfur heavy gasoline fraction, and the light fraction was controlled to have a final boiling point of 65-70° C. (according to ASTM D86 standard). The light gasoline fraction obtained by distillation was designated as LCN-A-1, and the heavy gasoline fraction was designated as HCN-A-1. The properties of the light gasoline fraction and the heavy gasoline fraction obtained by distillation are shown in Table 5.

The light gasoline fraction was subjected to a pretreatment including desulfurization and removal of dienes in the presence of hydrogen in a refining reactor, so that both the sulfur content and the diene content of the light gasoline fraction were reduced to below 10 ppm, and then mixed with methanol (analytically pure) and sent into an etherification reactor for etherification. The etherification conditions included a reaction temperature of 55-80° C., a space velocity of 1.2 $h^{-1}$, a molar ratio of methanol to active olefins in the light gasoline fraction of 1.2, and an etherification catalyst of strongly acidic cation-exchange resin (732 type, styrene-based). After the etherification reaction, the resulting oil and gas were introduced into an etherification product fractionation column for separation. A methanol-containing tail gas comprising residual C5 compounds and methanol was obtained at the top of the column, and an etherified oil was obtained at the bottom of the column. The temperature at the top of the etherification product fractionation column was 60-80° C., and the temperature at the bottom was 110-140° C. The corresponding etherified oil was designated as LCN-A-M-1 and its properties are also shown in Table 5.

The heavy gasoline fraction HCN-A-1 obtained after adsorption desulfurization was mixed with the etherified oil LCN-A-M-1 to obtain a high-octane clean gasoline product, the properties of which are shown in Table 6.

Example II-2

The gasoline feedstock was contacted with a mixed catalyst comprising the adsorption desulfurization catalyst FCAS and the aged OTAZ-C-3 catalyst in a small continuous fluidized bed reactor for adsorption desulfurization and aromatization, in which the OTAZ-C-3 catalyst was present in an amount of 7% by weight based on the total weight of the mixed catalyst.

The operating conditions were as follows: a reaction temperature of 400° C., a reactor pressure of 2.1 MPa, a weight hourly space velocity of the gasoline feedstock of 6 $h^{-1}$, and a volume ratio of hydrogen to the gasoline feedstock of 75. The desulfurization-aromatization product obtained from the top of the reactor was cooled to about 10° C., and separated to obtain a tail gas and a full-range gasoline. The regeneration temperature of the mixed catalyst was 550° C., and, after the regeneration, the mixed catalyst was returned to the reactor for recycling.

The full-range gasoline was treated in the same manner as in Example II-1, and the resulting light gasoline fraction was designated as LCN-A-2, the heavy gasoline fraction was designated as HCN-A-2, and the etherified oil was designated as LCN-A-M-2, the properties of which are shown in Table 5. The resulting etherified oil was mixed with the heavy gasoline fraction to obtain a high-octane clean gasoline product, the properties of which are shown in Table 6.

Example II-3

The gasoline feedstock was contacted with a mixed catalyst comprising the adsorption desulfurization catalyst FCAS and the fresh OTAZ-C-3 catalyst in a small continuous fluidized bed reactor for adsorption desulfurization and aromatization, in which the OTAZ-C-3 catalyst was present in an amount of 7% by weight based on the total weight of the mixed catalyst.

The operating conditions were as follows: a reaction temperature of 400° C., a reactor pressure of 2.1 MPa, a weight hourly space velocity of the gasoline feedstock of 6 $h^{-1}$, and a volume ratio of hydrogen to the gasoline feedstock of 75. The desulfurization-aromatization product obtained from the top of the reactor was cooled to about 10° C., and separated to obtain a tail gas and a full-range gasoline. The regeneration temperature of the mixed catalyst was 550° C., and, after the regeneration, the mixed catalyst was returned to the reactor for recycling.

The full-range gasoline was treated in the same manner as in Example II-1, and the resulting light gasoline fraction was designated as LCN-A-3, the heavy gasoline fraction was designated as HCN-A-3, and the etherified oil was designated as LCN-A-M-3, the properties of which are shown in Table 5. The resulting etherified oil was mixed with the heavy gasoline fraction to obtain a high-octane clean gasoline product, the properties of which are shown in Table 6.

Comparative Example II-1

The operation was substantially the same as in Example II-1, except that the passivated OTAZ-C-3 catalyst was replaced with an equivalent weight of the adsorption desulfurization catalyst FCAS. The properties of the resulting gasoline products are shown in Table 6.

TABLE 5

Properties of the fractions and etherified oils obtained in Examples II-1 to II-3

| | Example Nos. | | | | | |
|---|---|---|---|---|---|---|
| | II-1 | | II-2 | | II-3 | |
| Name of the light/heavy fraction | LCN-A-1 | HCN-A-1 | LCN-A-2 | HCN-A-2 | LCN-A-3 | HCN-A-3 |
| Percentage relative to the full-range stabilized gasoline, % | 22 | 78 | 22 | 78 | 24 | 76 |
| Density at 20° C., kg/m$^3$ | 645.0 | 762.0 | 645.0 | 762.0 | 645.0 | 762.0 |
| Total sulfur content, mg/L | 9 | 16 | 10 | 15 | 7 | 12 |
| Group composition (FIA method) | | | | | | |
| Aromatics, % (by volume) | 0 | 22.5 | 0 | 22.6 | 0 | 20.6 |
| Olefins, % (by volume) | 64.8 | 43.9 | 65.2 | 43.6 | 67.2 | 42.6 |
| Saturated hydrocarbons, % (by volume) | 35.2 | 33.6 | 34.8 | 33.8 | 32.8 | 36.8 |
| Name of the etherified oil | LCN-A-M-1 | | LCN-A-M-2 | | LCN-A-M-3 | |
| Percentage of etherified oil relative to the full-range stabilized gasoline, % | 24.5 | | 24.5 | | 26 | |
| Group composition (FIA method) | | | | | | |
| Aromatics, % (by volume) | 0 | | 0 | | 0 | |
| Olefins, % (by volume) | 19.3 | | 19.8 | | 18.5 | |
| Saturated hydrocarbons, % (by volume) | 33.5 | | 33.1 | | 31.1 | |

TABLE 6

Results of Examples II-1 to II-3 and Comparative Example II-1

| | Example Nos. | | | |
|---|---|---|---|---|
| | II-1 | II-2 | II-3 | Comp. Ex. II-1 |
| Name of the aromatization catalyst | OTAZ-C-3 | OTAZ-C-3 | OTAZ-C-3 | None |
| Type of the aromatization catalyst | Passivated | Aged | Fresh | / |
| Micro-activity of the aromatization catalyst | 35 | 40 | 80 | / |
| Etherification (Yes/No) | Yes | Yes | Yes | Yes |
| Gasoline yield relative to the feedstock, % | 103 | 103 | 102.7 | 101.2 |
| Density at 20° C., kg/m$^3$ | 740.3 | 740.6 | 736.5 | 740.8 |
| Refractive index at 20° C. | 1.4141 | 1.4146 | 1.4112 | 1.4146 |
| Vapor pressure (RVPE), kPa | 62 | 60 | 62 | 50 |
| Carbon content, %(w) | 85.87 | 85.84 | 85.97 | 85.84 |
| Hydrogen content, %(w) | 14.13 | 14.16 | 14.03 | 14.16 |
| Sulfur content, mg/L | 15 | 15 | 10 | 15 |
| Nitrogen content, mg/L | 57 | 57 | 52 | 57 |
| Induction period, min | >1000 | >1000 | >1000 | >1000 |
| Benzene, % (by volume) | 0.3 | 0.3 | 0.3 | 0.3 |

TABLE 6-continued

Results of Examples II-1 to II-3 and Comparative Example II-1

|  | Example Nos. | | | |
| --- | --- | --- | --- | --- |
|  | II-1 | II-2 | II-3 | Comp. Ex. II-1 |
| Group composition (FIA method) | | | | |
| Aromatics, % (by volume) | 19.9 | 19.8 | 18.6 | 18.3 |
| Olefins, % (by volume) | 20.8 | 20.9 | 20.8 | 21.9 |
| Saturated hydrocarbons, % (by volume) | 45.9 | 46.3 | 46.5 | 46.8 |
| Content of oxygenated compounds | | | | |
| MTBE, % (by mass) | 0.9 | 0.9 | 3.7 | 0.5 |
| TAME, % (by mass) | 11.5 | 11.5 | 10.5 | 9.5 |
| Others, % (by mass) | 0.5 | 0.5 | 0.9 | 0.5 |
| RON | 90.5 | 90.1 | 90 | 89.1 |
| MON | 79.3 | 79.1 | 79.1 | 78.5 |
| (RON + MON)/2 | 84.9 | 84.6 | 84.55 | 83.8 |
| Change in antiknock index | 0 | −0.3 | −0.35 | −1.1 |
| Distillation range under normal pressure, ° C. | | | | |
| IBP | 35 | 36 | 32 | 45 |
| 5% (φ) | 54 | 55 | 50 | 61 |
| 10% (φ) | 62 | 62 | 60 | 67 |
| 30% (φ) | 81 | 82 | 84 | 86 |
| 50% (φ) | 100 | 100 | 100 | 104 |
| 70% (φ) | 129 | 128 | 129 | 130 |
| 90% (φ) | 173 | 172 | 175 | 175 |
| FBP | 205 | 203 | 205 | 203 |

As shown in Table 6, in the case where the full-range gasoline was split into different fractions and the etherified oil obtained via the etherification of the light gasoline fraction was mixed with the heavy gasoline fraction to obtain a gasoline product, in Comparative Example II-1 using only the adsorption desulfurization catalyst FCAS, the octane number (antiknock index) of the resulting gasoline product was significantly lower than that of the gasoline feedstock. In Examples II-1 to II-3 using a mixed catalyst comprising the adsorption desulfurization catalyst FCAS and the aromatization catalyst OTAZ-C-3, the octane number of the resulting gasoline product was significantly improved as compared to Comparative Example II-1. Particularly, when an aromatization catalyst comprising a passivated or aged OTAZ-C-3 catalyst was used, the improvement was more remarkable.

In addition, when comparing the results shown in Tables 4 and 6, it can be seen that, in working examples comprising the splitting of the full-range gasoline and an etherification of the light gasoline fraction, the octane number of the resulting gasoline product was significantly improved, its olefin content was significantly lowered, and its vapor pressure was effectively controlled, especially when a fresh aromatization catalyst was used, and meanwhile the yield of gasoline was also increased to some extent, as compared to working examples that did not comprise the splitting of the full-range gasoline. Thus, in the case where a mixed catalyst was used in combination with an etherification treatment, a gasoline product having a low sulfur content, a low olefin content, a low vapor pressure, and a high octane number can be obtained in a high yield.

In the above specification, the inventive concept of the present application has been described with reference to specific embodiments. However, it will be understood by those skilled in the art that various modifications and changes can be made without departing from the scope of the present application. Accordingly, the specification and drawings should be considered to be illustrative rather than limiting, and all such modifications and changes should be covered by the present invention.

It is to be understood that some features described herein separately in different embodiments may be combined in a single embodiment. Meanwhile, some features described herein in a single embodiment for the sake of brevity may also be provided separately or in any sub-combination in different embodiments.

The invention claimed is:

1. A process for treating gasoline, comprising:
   contacting a gasoline feedstock with a mixed catalyst for desulfurization and aromatization in the presence of hydrogen to obtain a desulfurization-aromatization product,
   wherein the mixed catalyst comprises an adsorption desulfurization catalyst and an aromatization catalyst, and wherein the aromatization catalyst comprises at least about 50 wt % of passivated aromatization catalyst and/or aged aromatization catalyst, and has a microactivity within a range from about 20 to about 55.

2. A process for treating gasoline, comprising:
   1) contacting a gasoline feedstock with a mixed catalyst for desulfurization and aromatization in the presence of hydrogen to obtain a desulfurization-aromatization product;
   2) splitting at least a portion of the resulting desulfurization-aromatization product into a light gasoline fraction and a heavy gasoline fraction;
   3) subjecting at least a portion of the resulting light gasoline fraction to etherification to obtain an etherified oil; and 4) optionally, mixing at least a portion of the etherified oil with at least a portion of the heavy gasoline fraction to provide a gasoline product,
wherein the mixed catalyst comprises an adsorption desulfurization catalyst and an aromatization catalyst, and wherein the aromatization catalyst comprises at least about 50 wt % of passivated aromatization catalyst and/or aged aromatization catalyst, and has a microactivity within a range from about 20 to about 55.

3. The process according to claim 1, wherein the aromatization catalyst comprises fresh aromatization catalyst and passivated aromatization catalyst, wherein the passivated aromatization catalyst is produced by contacting fresh aromatization catalyst with a compound containing carbon, sulfur and/or nitrogen to conduct a passivation reaction.

4. The process according to claim 1, wherein the aromatization catalyst comprises fresh aromatization catalyst and aged aromatization catalyst, wherein the aged aromatization catalyst is produced by treating fresh aromatization catalyst at a temperature within a range from about 500° C. to about 800° C. for an aging time within a range from about 1 hours to about 360 hours and in an aging atmosphere containing steam.

5. The process according to claim 1, wherein the gasoline feedstock has at least one of the following characteristics:
 1) an olefin content of greater than about 20% by volume;
 2) a sulfur content of about 10 μg/g or above; and
 3) being at least one selected from the group consisting of catalytic cracking gasoline, deep catalytic cracking gasoline, coker gasoline, thermal cracking gasoline, straight-run gasoline, and a fraction thereof.

6. The process according to claim 2, wherein the split point between the light gasoline fraction and the heavy gasoline fraction is within a range from about 60° C. to about 80° C.

7. The process according to claim 2, wherein the etherification comprises the step of:
 contacting the light gasoline fraction with an alcohol to subject the olefin in the light gasoline fraction to an etherification reaction with the alcohol in the presence of an etherification catalyst to obtain the etherified oil, wherein the etherification is carried out under the following conditions: a temperature within a range from about 20° C. to about 200° C., a pressure within a range from about 0.1 MPa to about 5 MPa, a weight hourly space velocity within a range from about 0.1 hr$^{-1}$ to about 20 h$^{-1}$, and a molar ratio of the alcohol to the light gasoline fraction within a range of about 1:0.1 to 1:100;
 and the etherification catalyst comprises at least one selected from the group consisting of resins, molecular sieves, and heteropolyacids.

8. The process according to claim 1, wherein the desulfurization and aromatization are carried out in a riser reactor and a dense phase fluidized reactor.

9. The process according to claim 1, wherein the adsorption desulfurization catalyst comprises silica, alumina, zinc oxide, and a desulfurization active metal, and the desulfurization active metal is at least one selected from the group consisting of cobalt, nickel, copper, iron, manganese, molybdenum, tungsten, silver, tin and vanadium.

10. The process according to claim 9, wherein on the basis of oxides, the zinc oxide is present in an amount ranging from about 10% to about 90% by weight, the silica is present in an amount ranging from about 5% to about 85% by weight, and the alumina is present in an amount ranging from about 5% to about 30% by weight based on the dry weight of the adsorption desulfurization catalyst; and on the elemental basis, the desulfurization active metal is present in the adsorption desulfurization catalyst in an amount ranging from about 5% to about 30% by weight based on the dry weight of the adsorption desulfurization catalyst.

11. The process according to claim 1, wherein, on dry basis, the aromatization catalyst comprises about 10% to about 30% by weight of a molecular sieve, about 0% to about 20% by weight of an aromatization active metal oxide and about 50% to about 90% by weight of a support, based on the total weight of the aromatization catalyst;
 wherein the molecular sieve comprises a Y molecular sieve and/or an MFI structural molecular sieve, the aromatization active metal is at least one selected from the group consisting of metal elements of Group IVB, metal elements of Group VB, metal elements of Group VIB, metal elements of Group VIII, metal elements of Group IB, metal elements of Group BB, and metal elements of Group IIIA, and the support comprises silica and/or alumina.

12. The process according to claim 1, wherein the aromatization catalyst is prepared from a starting material comprising about 15% to about 60% by weight of a natural mineral, about 10% to about 30% by weight of a precursor of an inorganic oxide binder, and about 20% to about 80% by weight of a MFI structural molecular sieve containing phosphorus and supported metal, based on the dry weight of the starting material,
 wherein the MFI structural molecular sieve has a n(SiO$_2$)/n(Al$_2$O$_3$) ratio of greater than about 100; a phosphorus content, on the basis of P$_2$O$_5$, within a range from about 0.1% to about 5% by weight based on the dry weight of the molecular sieve; a supported-metal content, on the basis of oxides, within a range from about 0.5% to about 5% by weight based on the dry weight of the molecular sieve; an Al distribution parameter D(Al) satisfying 0.6≤D(Al)≤0.85; a supported-metal distribution parameter D(M) satisfying 2≤D(M)≤10; a mesopore volume percentage within a range from about 40% to about 80% relative to the total pore volume; a percentage of strong acid content relative to the total acid content within a range from about 60% to about 80%; and a ratio of the Bronsted acid content to the Lewis acid content within a range from about 15 to about 80.

13. The process according to claim 12, wherein the supported metal is at least one of zinc, gallium and iron.

14. The process according to claim 1, wherein the percentage of the aromatization catalyst relative to the mixed catalyst is within a range from about 1% to 30% by weight.

15. The process according to claim 1, wherein the desulfurization and aromatization are carried out under the following conditions: a reaction temperature within a range from about 350° C. to about 500° C., a weight hourly space velocity within a range from about 2 h$^{-1}$ to about 50 h$^{-1}$, a reaction pressure within a range from about 0.5 MPa to about 3.0 MPa, and a volume ratio of hydrogen to the gasoline feedstock within a range from about 1 to about 500.

16. The process according to claim 1, wherein at least about 80 wt % of the aromatization catalyst has undergone a passivation and/or aging treatment.

17. The process according to claim 1, wherein at least about 90 wt % of the aromatization catalyst has undergone a passivation and/or aging treatment.

18. The process according to claim 1, wherein at least about 95 wt % of the aromatization catalyst has undergone a passivation and/or aging treatment.

\* \* \* \* \*